(12) United States Patent
Shoji et al.

(10) Patent No.: US 11,845,500 B2
(45) Date of Patent: Dec. 19, 2023

(54) STEERING SYSTEM

(71) Applicant: JTEKT CORPORATION, Kariya (JP)

(72) Inventors: Naoki Shoji, Shiki-gun (JP); Tomohiro Nakade, Sakurai (JP); Robert Fuchs, Nara (JP)

(73) Assignee: JTEKT CORPORATION, Kariya (JP)

( * ) Notice: Subject to any disclaimer, the term of this patent is extended or adjusted under 35 U.S.C. 154(b) by 335 days.

(21) Appl. No.: 17/458,016

(22) Filed: Aug. 26, 2021

(65) Prior Publication Data

US 2022/0063713 A1 Mar. 3, 2022

(30) Foreign Application Priority Data

Aug. 31, 2020 (JP) ................................. 2020-145999

(51) Int. Cl.
*B62D 5/04* (2006.01)
*B62D 1/02* (2006.01)

(52) U.S. Cl.
CPC ............ *B62D 5/0463* (2013.01); *B62D 1/02* (2013.01); *B62D 5/0403* (2013.01); *B62D 5/0409* (2013.01)

(58) Field of Classification Search
CPC .......... B62D 5/00; B62D 5/001; B62D 5/006; B62D 5/04; B62D 5/0403; B62D 5/0409; B62D 5/0421; B62D 5/0457; B62D 5/046; B62D 5/0463; B62D 5/0469; B62D 6/02; B62D 6/002; B62D 6/008; B62D 6/10; B62D 15/02; B62D 15/0235
USPC .......................... 180/402, 446; 701/401–403
See application file for complete search history.

(56) References Cited

U.S. PATENT DOCUMENTS

| 11,383,760 | B2 * | 7/2022 | Nakade | B62D 5/001 |
| 11,691,664 | B2 * | 7/2023 | Moreillon | B62D 6/002 |
| | | | | 180/446 |
| 2004/0064229 | A1 | 4/2004 | Stout et al. | |
| 2015/0329140 | A1 * | 11/2015 | Tamaizumi | B62D 6/02 |
| | | | | 701/42 |
| 2019/0329818 | A1 | 10/2019 | Shoji et al. | |
| 2020/0269906 | A1 * | 8/2020 | Nakade | B62D 5/001 |
| 2021/0253161 | A1 * | 8/2021 | Yoshida | B62D 5/0463 |
| 2022/0017143 | A1 * | 1/2022 | Shoji | B62D 15/025 |

FOREIGN PATENT DOCUMENTS

| JP | 2004-224238 A | 8/2004 |
| JP | 2019-194059 A | 11/2019 |

OTHER PUBLICATIONS

Jan. 25, 2022 Extended European Search Report issued in Patent Application No. 21193284.3.

\* cited by examiner

*Primary Examiner* — John Kwon
*Assistant Examiner* — Johnny H Hoang
(74) *Attorney, Agent, or Firm* — Oliff PLC

(57) ABSTRACT

A steering system includes a control unit. The control unit includes a manual steering angle command value setting unit, a first weighting unit, a reaction combined angle command value calculating unit, a turning combined angle command value calculating unit, a reaction force control unit configured to cause a rotation angle of a reaction motor to conform to a reaction combined angle command value, and a turning angle control unit configured to cause a rotation angle of a turning motor to conform to a turning combined angle command value.

10 Claims, 12 Drawing Sheets

STEERING SYSTEM

CROSS-REFERENCE TO RELATED APPLICATION

This application claims priority to Japanese Patent Application No. 2020-145999 filed on Aug. 31, 2020, incorporated herein by reference in its entirety.

BACKGROUND

1. Technical Field

The disclosure relates to a steering system in which a turning mechanism is driven by a turning motor in a state in which the turning mechanism is not mechanically coupled to a steering member that is operated for steering.

2. Description of Related Art

Japanese Unexamined Patent Application Publication No. 2004-224238 (JP 2004-224238 A) discloses a steer-by-wire system in which a turning mechanism is driven by a turning motor (a steering motor) in a state in which a steering member that is operated for steering and the turning mechanism are not mechanically coupled to each other. The steer-by-wire system described in JP 2004-224238 A includes an operation unit that includes an operation reaction motor, a turning unit that includes a turning motor, an operation reaction control unit that controls the operation unit, a turning control unit that controls a turning unit, and an automatic tracking system. The turning control unit controls the turning motor based on a final target turning angle.

In the automatic tracking system described in JP 2004-224238 A, the final target turning angle is set as follows. When the automatic tracking system is not operating, a target turning angle which is calculated based on an operation angle of a steering wheel is set as the final target turning angle (a manual steering mode). When the automatic tracking system is operating and a steering torque is equal to or greater than a first threshold value or when the automatic tracking system is operating and an operation angle is equal to or greater than a second threshold value, a value which is obtained by multiplying a target turning angle calculated based on the operation angle of the steering wheel by a predetermined value greater than 1 is set as the final target turning angle (a transition mode). When the automatic tracking system is operating, the steering torque is less than the first threshold value, and the operation angle is less than the second threshold value, a target steering angle which is set by the automatic tracking system is set as the final target turning angle (a transition mode).

SUMMARY

The disclosure provides a steering system that can switch between a cooperative steering mode in which a turning motor is controlled based on a cooperative steering command value calculated in consideration of an automatic steering angle command value and a manual steering angle command value and an automatic steering mode or a manual steering mode.

According to a first aspect of the disclosure, there is provided a steering system including: a steering member; a turning mechanism that is mechanically disconnected from the steering member; a reaction motor configured to apply a reaction torque to the steering member; a turning motor configured to drive the turning mechanism; a steering torque detecting unit configured to detect a steering torque which is applied to the steering member; and a control unit configured to control driving of the reaction motor and the turning motor. The control unit includes: a manual steering angle command value setting unit configured to set a manual steering angle command value based on the steering torque; a first weighting unit configured to perform a weighting process on the manual steering angle command value in accordance with predetermined first information; a reaction combined angle command value calculating unit configured to calculate a reaction combined angle command value based on a reaction automatic steering angle command value and the manual steering angle command value weighted by the first weighting unit; a turning combined angle command value calculating unit configured to calculate a turning combined angle command value based on a turning automatic steering angle command value and the manual steering angle command value weighted by the first weighting unit; a reaction force control unit configured to cause a rotation angle of the reaction motor to conform to the reaction combined angle command value; and a turning angle control unit configured to cause a rotation angle of the turning motor to conform to the turning combined angle command value.

With this configuration, it is possible to switch between a cooperative steering mode in which the turning motor is controlled based on the combined angle command value which is a cooperative steering command value calculated in consideration of the automatic steering angle command value and the manual steering angle command value, and an automatic steering mode in which the turning motor is controlled based on only the automatic steering angle command value.

According to a second aspect of the disclosure, there is provided a steering system including: a steering member; a turning mechanism that is mechanically disconnected from the steering member; a reaction motor configured to apply a reaction torque to the steering member; a turning motor configured to drive the turning mechanism; a steering torque detecting unit configured to detect a steering torque which is applied to the steering member; and a control unit configured to control driving of the reaction motor and the turning motor. The control unit includes: a manual steering angle command value setting unit configured to set a manual steering angle command value based on the steering torque; a second weighting unit configured to perform a weighting process on a reaction automatic steering angle command value and a turning automatic steering angle command value in accordance with predetermined second information; a reaction combined angle command value calculating unit configured to calculate a reaction combined angle command value based on the manual steering angle command value and the reaction automatic steering angle command value weighted by the second weighting unit; a turning combined angle command value calculating unit configured to calculate a turning combined angle command value based on the manual steering angle command value and the turning automatic steering angle command value weighted by the second weighting unit; a reaction force control unit configured to cause a rotation angle of the reaction motor to conform to the reaction combined angle command value; and a turning angle control unit configured to cause a rotation angle of the turning motor to conform to the turning combined angle command value.

With this configuration, it is possible to switch between a cooperative steering mode in which the turning motor is controlled based on the combined angle command value which is a cooperative steering command value calculated in consideration of the automatic steering angle command value and the manual steering angle command value, and a manual steering mode in which the turning motor is controlled based on only the manual steering angle command value.

According to a third aspect of the disclosure, there is provided a steering system including: a steering member; a turning mechanism that is mechanically disconnected from the steering member; a reaction motor configured to apply a reaction torque to the steering member; a turning motor configured to drive the turning mechanism; a steering torque detecting unit configured to detect a steering torque which is applied to the steering member; and a control unit configured to control driving of the reaction motor and the turning motor. The control unit includes: a manual steering angle command value setting unit configured to set a manual steering angle command value based on the steering torque; a third weighting unit configured to perform a weighting process on the manual steering angle command value in accordance with predetermined third information; a fourth weighting unit configured to perform a weighting process on a reaction automatic steering angle command value and a turning automatic steering angle command value in accordance with predetermined fourth information; a reaction combined angle command value calculating unit configured to calculate a reaction combined angle command value based on the manual steering angle command value weighted by the third weighting unit and the reaction automatic steering angle command value weighted by the fourth weighting unit; a turning combined angle command value calculating unit configured to calculate a turning combined angle command value based on the manual steering angle command value weighted by the third weighting unit and the turning automatic steering angle command value weighted by the fourth weighting unit; a reaction force control unit configured to cause a rotation angle of the reaction motor to conform to the reaction combined angle command value; and a turning angle control unit configured to cause a rotation angle of the turning motor to conform to the turning combined angle command value.

With this configuration, it is possible to switch between a cooperative steering mode in which the turning motor is controlled based on the combined angle command value which is a cooperative steering command value calculated in consideration of the automatic steering angle command value and the manual steering angle command value, an automatic steering mode in which the turning motor is controlled based on only the automatic steering angle command value, and a manual steering mode in which the turning motor is controlled based on only the manual steering angle command value.

In the third aspect, the control unit may include: an automatic steering mode in which the reaction motor and the turning motor are controlled based on the reaction automatic steering angle command value and the turning automatic steering angle command value; a manual steering mode in which the reaction motor and the turning motor are controlled based on the manual steering angle command value; and a cooperative steering mode in which the reaction motor and the turning motor are controlled based on the reaction automatic steering angle command value and the manual steering angle command value and a cooperative steering command value which is the turning combined angle command value calculated in consideration of the turning automatic steering angle command value and the manual steering angle command value. The control unit may be configured to control the reaction motor and the turning motor in the cooperative steering mode unconditionally or when a predetermined condition is satisfied, in a case where a situation in which the automatic steering mode is to be switched to the manual steering mode is detected during control in the automatic steering mode and a manual steering request is output to a driver at a point a first predetermined time or a first predetermined distance before a point at which the situation is reached.

In the third aspect, the control unit may be configured to weight the manual steering angle command value based on a degree of alertness of the driver using the third weighting unit and to control the reaction motor and the turning motor in the cooperative steering mode using the weighted manual steering angle command value, when the manual steering request is output to the driver. In the third aspect, the predetermined condition may be a condition that a degree of alertness of the driver is equal to or greater than a predetermined threshold value.

In the third aspect, the control unit may be configured to output an automatic stop request for generating the automatic steering angle command value for moving and stopping a vehicle at a predetermined stop position when steering performed by the driver is not detected at or before a point a second predetermined time or a second predetermined distance before the point at which the situation is reached, after the manual steering request has been output.

The steering system according to the above aspects may further include a switching unit configured to switch a control mode of the reaction motor and the turning motor to a manual steering mode based on a driver's operation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the disclosure will be described in detail with reference to the accompanying drawings.

(1) First Embodiment

Figure 1:
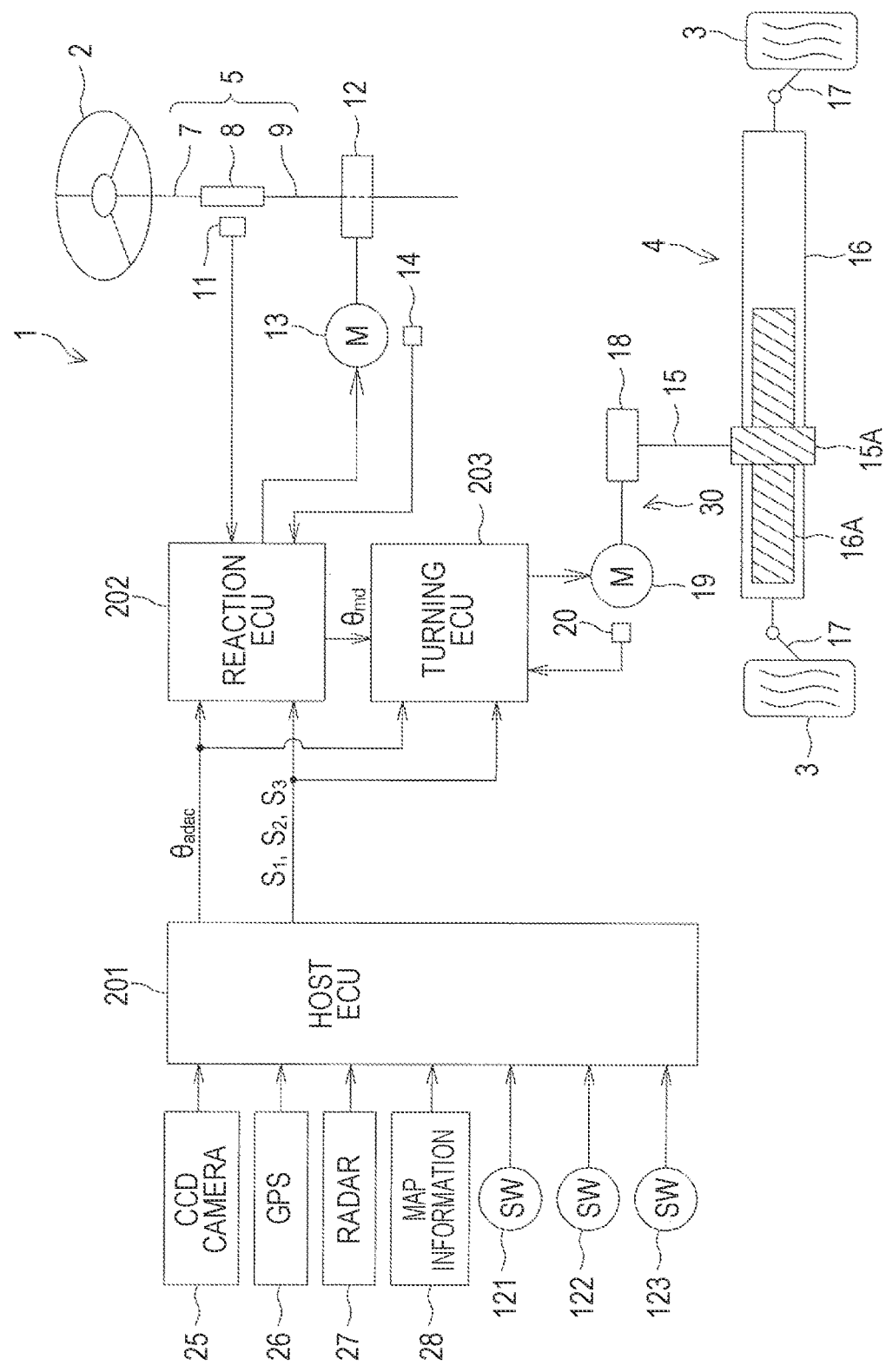
FIG. 1 is a diagram schematically illustrating a configuration of a steering system according to a first embodiment of the disclosure.

An outline of a configuration of a steering system 1 according to a first embodiment will be described below. As illustrated in FIG. 1, the steering system 1 includes a steering wheel 2 that is a steering member for steering a vehicle, a turning mechanism 4 that turns turning wheels 3, and a steering shaft 5 that is connected to the steering wheel 2. Here, there is no mechanical coupling for transmission of movement such as a torque or a rotational motion between the steering shaft 5 and the turning mechanism 4.

The steering shaft 5 includes a first shaft 7 of which one end is connected to the steering wheel 2, a torsion bar 8 of which one end is connected to the other end of the first shaft 7, and a second shaft 9 of which one end is connected to the other end of the torsion bar 8. A torque sensor 11 is disposed in the vicinity of the torsion bar 8. The torque sensor 11 detects a steering torque (a torsion bar torque) $T_d$ which is applied to the steering wheel 2 based on a relative rotational displacement between the first shaft 7 and the second shaft 9. In this embodiment, regarding the steering torque $T_d$ detected by the torque sensor 11, a torque for steering to the left is detected as a positive value, a torque for steering to the right is detected as a negative value, and the magnitude of the steering torque $T_d$ increases as the absolute value thereof increases.

A reaction motor 13 that controls a rotation angle of the second shaft 9 (hereinafter also referred to as a "steering wheel angle") is connected to the second shaft 9 via a speed reducer 12. The reaction motor 13 is an electric motor that applies a reaction torque to the second shaft 9. The speed reducer 12 is constituted by a worm gear mechanism including a worm shaft (not illustrated) that is integrally rotatably connected to an output shaft of the reaction motor 13 and a worm wheel (not illustrated) that engages with the worm shaft and that is integrally rotatably connected to the second shaft 9. A rotation angle sensor 14 that detects a rotation angle of the reaction motor 13 is provided in the reaction motor 13.

The turning mechanism 4 is constituted by a rack and pinion mechanism including a pinion shaft 15 and a rack shaft 16. Turning wheels 3 are connected to ends of the rack shaft 16 via tie rods 17 and knuckle arms (not illustrated). The pinion shaft 15 is connected to an output shaft of a turning motor 19 via a speed reducer 18. The speed reducer 18 is constituted by a worm gear mechanism including a worm shaft (not illustrated) that is integrally rotatably connected to the output shaft of the turning motor 19 and a worm wheel (not illustrated) that engages with the worm shaft and that is integrally rotatably connected to the pinion shaft 15. A pinion 15A is connected to a distal end of the pinion shaft 15. A rotation angle sensor 20 that detects a rotation angle of the turning motor 19 is provided in the turning motor 19.

In the following description, a reduction ratio (a gear ratio) of the speed reducer 12 is represented by $N_1$ and a reduction ratio of the speed reducer 18 is represented by $N_2$. The reduction ratio is defined as a ratio $\omega_{wg}/\omega_{ww}$ of an angular velocity $\omega_{wg}$ of the worm gear to an angular velocity $\omega_{ww}$ of the worm wheel. The rack shaft 16 extends straight in a vehicle width direction. A rack 16A that engages with the pinion 15A is formed in the rack shaft 16. When the turning motor 19 rotates, a rotational force thereof is transmitted to the pinion shaft 15 via the speed reducer 18. The rotation of the pinion shaft 15 is converted to an axial motion of the rack shaft 16 by the rack and pinion mechanism. Accordingly, the turning wheels 3 are turned.

A charge coupled device (CCD) camera 25 that images (i.e., captures an image of) a road in front of the vehicle in the traveling direction of the vehicle, a Global Positioning System (GPS) 26 that detects a position of the vehicle, a radar 27 that detects a road shape or an obstacle, and a map information memory 28 that stores map information are mounted in the vehicle. First, second, and third mode switches 121, 122, and 123 used to manually switch a steering mode are mounted in the vehicle.

As will be described later, the steering mode includes a manual steering mode in which steering is performed by manual driving, an automatic steering mode in which steering is performed by automated driving, and a cooperative steering mode in which steering based on both manual driving and automated driving can be performed. The CCD camera 25, the GPS 26, the radar 27, and the map information memory 28 are connected to a host electronic control unit (ECU) 201 that performs driving support control or automated driving control. The host ECU 201 performs surrounding environment recognition, host vehicle position estimation, route planning, and the like based on information acquired from the CCD camera 25, the GPS 26, and the radar 27 and map information acquired from the map information memory 28, and determines a control target value of steering or drive actuators.

In this embodiment, the host ECU 201 sets a turning automated steering angle command value for automatic steering as an automatic steering angle command value $\theta_{adac}$. In this embodiment, automatic steering control is, for example, control for causing a vehicle to travel along a target trajectory. The automatic steering angle command value $\theta_{adac}$ is a target value of a steering angle for causing the vehicle to travel automatically along the target trajectory. The process of setting such an automatic steering angle command value $\theta_{adac}$ is widely known and detailed description thereof will be omitted herein.

The host ECU 201 generates mode setting signals $S_1$, $S_2$, and $S_3$ based on an operation of the mode switches 121, 122, and 123. Specifically, when the first mode switch 121 is turned on by a driver, the host ECU 201 outputs a cooperative steering mode setting signal $S_1$ for setting the steering mode to the cooperative steering mode. When the second mode switch 122 is turned on by a driver, the host ECU 201 outputs an automatic steering mode setting signal $S_2$ for setting the steering mode to the automatic steering mode. When the third mode switch 123 is turned on by a driver, the host ECU 201 outputs a manual steering mode setting signal $S_3$ for setting the steering mode to the manual steering mode.

In this embodiment, the automatic steering angle command value $\theta_{adac}$ and an assist torque command value $T_{ac}$ and a manual steering angle command value $\theta_{mdac}$ which will be described later are set to positive values when the second shaft 9 is rotated in a left steering direction by the reaction motor 13 or when the turning wheels 3 are turned in the left steering direction by the turning motor 19. On the other hand, these command values $\theta_{adac}$, $T_{ac}$, and $\theta_{mdac}$ are set to negative values when the second shaft 9 is rotated in a right steering direction by the reaction motor 13 or when the turning wheels 3 are turned in the right steering direction by the turning motor 19. In this embodiment, the automatic steering angle command value $\theta_{adac}$ is set as a rotation angle of the pinion shaft 15, and the manual steering angle command value $\theta_{mdac}$ is set as a rotation angle of the second shaft 9.

The automatic steering angle command value $\theta_{adac}$ set by the host ECU 201 and the mode setting signals $S_1$, $S_2$, and $S_3$ generated by the host ECU 201 are supplied to a reaction ECU 202 and a turning ECU 203 via an onboard network. The reaction ECU 202 is an ECU that controls the reaction motor 13, and the turning ECU 203 is an ECU that controls the turning motor 19.

Figure 2:
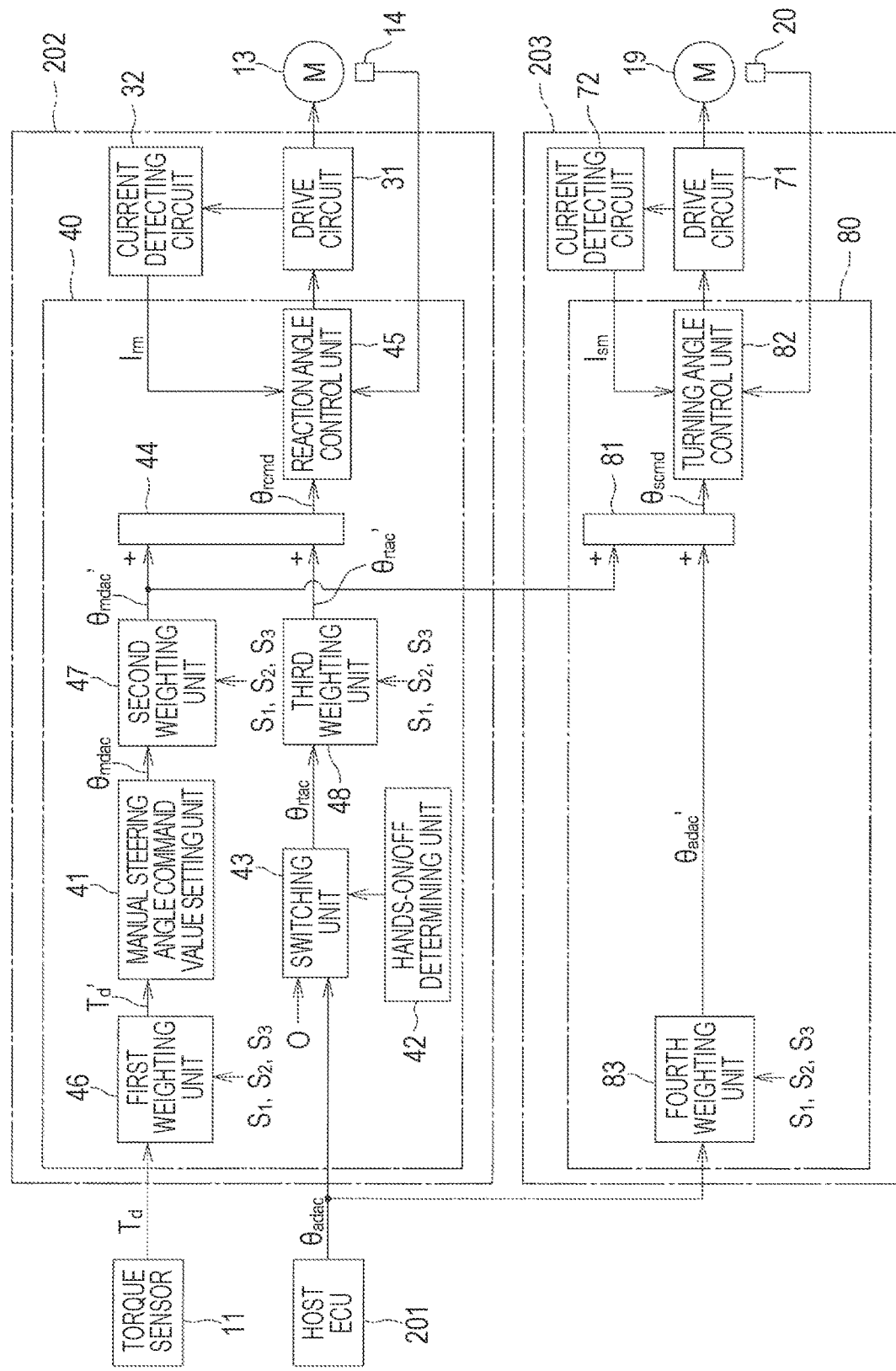
FIG. 2 is a block diagram illustrating an electrical configuration of a reaction ECU and a turning ECU.

The steering torque $T_d$ detected by the torque sensor 11 and an output signal of the rotation angle sensor 14 are input to the reaction ECU 202. The reaction ECU 202 controls the reaction motor 13 based on the input signal and information which is input from the host ECU 201. The output signal of the rotation angle sensor 20 is input to the turning ECU 203. The turning ECU 203 controls the turning motor 19 based on the output signal of the rotation angle sensor 20, information which is supplied from the reaction ECU 202, and information which is supplied from the host ECU 201. Electrical configurations of the reaction ECU 202 and the turning ECU 203 will be described below. The reaction ECU 202 will be first described. As illustrated in FIG. 2, the reaction ECU 202 includes a microcomputer 40, a drive circuit (an inverter circuit) 31 that is controlled by the microcomputer 40 and that supplies electric power to the reaction motor 13, and a current detecting circuit 32 that detects a current flowing in the reaction motor 13 (hereinafter referred to as a "motor current $I_{rm}$").

The microcomputer 40 includes a CPU and a memory (such as a ROM and a RAM) and serves as a plurality of functional processing units by executing a predetermined program. In other words, the microcomputer 40 serves as an example of a "control unit" in the disclosure by executing a predetermined program. The plurality of functional processing units includes a manual steering angle command value setting unit 41, a hands-on/off determination unit 42, a switching unit 43, a reaction combined angle command value calculating unit 44, a reaction angle control unit 45, a first weighting unit 46, a second weighting unit 47, and a third weighting unit 48. The reaction angle control unit 45 is an example of a "reaction force control unit" in the disclosure.

The first weighting unit 46 performs a first weighting process on the steering torque $T_d$ detected by the torque sensor 11 in accordance with a mode setting signal input thereto. Specifically, first, the first weighting unit 46 sets a first weighting $W_{md}$ in accordance with a current steering mode and the input mode setting signal when one of the mode setting signals $S_1$, $S_2$, and $S_3$ is input thereto. Then, the first weighting unit 46 multiplies the steering torque $T_d$ by the first weighting $W_{md}$. Then, the first weighting unit 46 supplies the multiplied value $W_{md} \cdot T_d$ as a steering torque $T_d'$ subjected to the first weighting process, to the manual steering angle command value setting unit 41.

The manual steering angle command value setting unit 41 is provided to set a steering angle corresponding to an operation of the steering wheel 2 (more accurately, the rotation angle of the second shaft 9) as the manual steering angle command value $\theta_{mdac}$ when a driver operates the steering wheel 2. The manual steering angle command value setting unit 41 sets the manual steering angle command value $\theta_{mdac}$ using the steering torque $T_d'$ subjected to the first weighting process. Details of the manual steering angle command value setting unit 41 will be described later. The manual steering angle command value $\theta_{mdac}$ set by the manual steering angle command value setting unit 41 is supplied to the second weighting unit 47.

The second weighting unit 47 performs a second weighting process on the manual steering angle command value $\theta_{mdac}$ set by the manual steering angle command value setting unit 41 in accordance with a mode setting signal input thereto. Specifically, the second weighting unit 47 sets a first weighting $W_{md}$ in accordance with the current steering mode and the input mode setting signal when one of the mode setting signals $S_1$, $S_2$, and $S_3$ is input thereto. Then, the second weighting unit 47 multiplies the manual steering angle command value $\theta_{mdac}$ by the first weighting $W_{md}$. Then, the second weighting unit 47 supplies the multiplied value $W_{md} \cdot \theta_{mdac}$ as a manual steering angle command value $\theta_{mdac}'$ subjected to the second weighting process, to the reaction combined angle command value calculating unit 44.

The hands-on/off determination unit 42 determines whether a driver grasps the steering wheel 2 (hands-on) or does not grasp the steering wheel 2 (hands-off). A unit that determines hands-on/off based on an output signal of a touch sensor which is provided in the steering wheel 2, a unit that determines hands-on/off based on an image captured by a camera which is provided in the vehicle, or the like can be used as the hands-on/off determination unit 42. A unit having a configuration other than the aforementioned configuration can be used as the hands-on/off determination unit 42 as long as it can determine hands-on/off. A hands-one/off determination signal output from the hands-on/off determination unit 42 is supplied to the switching unit 43.

When the hands-on/off determination unit 42 determines that a driver grasps the steering wheel 2, the switching unit 43 supplies the automatic steering angle command value $\theta_{adac}$ set by the host ECU 201 as a reaction automatic steering angle command value $\theta_{rtac}$ to the third weighting unit 48. On the other hand, when the hands-on/off determination unit 42 determines that a driver does not grasp the steering wheel 2, the switching unit 43 supplies zero as the reaction automatic steering angle command value $\theta_{rtac}$ to the third weighting unit 48.

The third weighting unit 48 performs a third weighting process on the reaction automatic steering angle command value $\theta_{rtac}$ supplied from the switching unit 43 in accordance with a mode setting signal input thereto. Specifically, the third weighting unit 48 sets a second weighting $W_{ad}$ in accordance with the current steering mode and the input mode setting signal when one of the mode setting signals $S_1$, $S_2$, and $S_3$ is input thereto. Then, the third weighting unit 48 multiplies the reaction automatic steering angle command value $\theta_{rtac}$ by the second weighting $W_{ad}$. Then, the third weighting unit 48 supplies the multiplied value $W_{ad} \cdot \theta_{rtac}$ as a reaction automatic steering angle command value $\theta_{mdac}'$ subjected to the third weighting process, to the reaction combined angle command value calculating unit 44.

The reaction combined angle command value calculating unit 44 calculates a reaction combined angle command value $\theta_{rcmd}$ by adding the reaction automatic steering angle command value $\theta_{rtac}'$ subjected to the third weighting process which is supplied from the third weighting unit 48 to the manual steering angle command value $\theta_{mdac}'$ subjected to the second weighting process which is supplied from the second weighting unit 47. Details of the first weighting $W_{md}$ set by the first and second weighting unit 46 and 47 and details of the second weighting $W_{ad}$ set by the third weighting unit 48 will be described later.

The reaction angle control unit 45 controls the angle of the reaction motor 13 based on the reaction combined angle command value $\theta_{rcmd}$. More specifically, the reaction angle control unit 45 controls driving of the drive circuit 31 such that a steering angle $\theta_{rt}$ (the rotation angle of the second shaft 9) approaches the reaction combined angle command value $\theta_{rcmd}$. Details of the reaction angle control unit 45 will be described later. The turning ECU 203 will be described below. The turning ECU 203 includes a microcomputer 80, a drive circuit (an inverter circuit) 71 that is controlled by the microcomputer 80 and that supplies electric power to the turning motor 19, and a current detecting circuit 72 that detects a current flowing in the turning motor 19 (hereinafter referred to as a "motor current $I_{sm}$").

The microcomputer 80 includes a CPU and a memory (such as a ROM and a RAM) and serves as a plurality of functional processing units by executing a predetermined program. The plurality of functional processing units includes a turning combined angle command value calculating unit 81, a turning angle control unit 82, and a fourth weighting unit 83. The turning angle control unit 82 is an example of a "turning angle control unit" in the disclosure.

The fourth weighting unit 83 performs a fourth weighting process on the automatic steering angle command value $\theta_{adac}$ supplied from the host ECU 201 in accordance with a mode setting signal input thereto. Specifically, the fourth weighting unit 83 first sets a second weighting $W_{ad}$ in accordance with the current steering mode and the input mode setting signal when one of the mode setting signals $S_1$, $S_2$, and $S_3$ is input thereto. Then, the fourth weighting unit 83 multiplies the automatic steering angle command value $\theta_{adac}$ by the second weighting $W_{ad}$. Then, the fourth weighting unit 83 supplies the multiplied value $W_{ad} \cdot \theta_{adac}$ as an automatic steering angle command value $\theta_{adac}'$ subjected to the fourth weighting process, to the turning combined angle command value calculating unit 81.

The turning combined angle command value calculating unit 81 calculates a turning combined angle command value $\theta_{scmd}$ by adding the manual steering angle command value $\theta_{mdac}'$ subjected to the second weighting process supplied from the second weighting unit 47 in the reaction ECU 202, to the automatic steering angle command value $\theta_{adac}'$ subjected to the fourth weighting process which is supplied from the fourth weighting unit 83. Details of the second weighting $W_{ad}$ set by the fourth weighting unit 83 will be described later.

The turning angle control unit 82 controls the angle of the turning motor 19 based on the turning combined angle command value $\theta_{scmd}$. More specifically, the turning angle control unit 82 controls driving of the drive circuit 71 such that a turning angle $\theta_{sp}$ (the rotation angle of the pinion shaft 15) approaches the turning combined angle command value $\theta_{scmd}$. Details of the turning angle control unit 82 will be described later. In the configuration illustrated in FIG. 2, the first and second weighting units 46 and 47 are an example of a "first weighting unit" or a "third weighting unit" in the disclosure, and the third and fourth weighting units 48 and 83 are an example of a "second weighting unit" or a "fourth weighting unit" in the disclosure. The mode setting signals $S_1$, $S_2$, and $S_3$ are an example of "predetermined first information," "predetermined second information," "predetermined third information," or "predetermined fourth information" in the disclosure.

Figure 3:
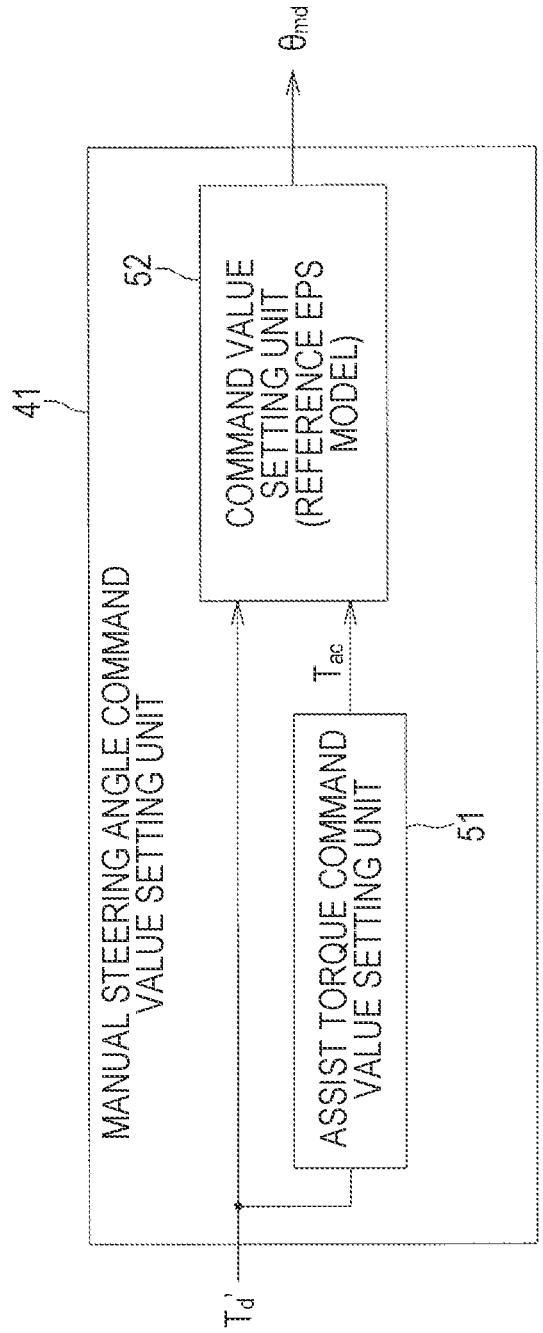
FIG. 3 is a block diagram illustrating a configuration of a manual steering angle command value setting unit.

The configuration of the manual steering angle command value setting unit 41 will be described below. As illustrated in FIG. 3, the manual steering angle command value setting unit 41 includes an assist torque command value setting unit 51 and a command value setting unit 52.

Figure 4:
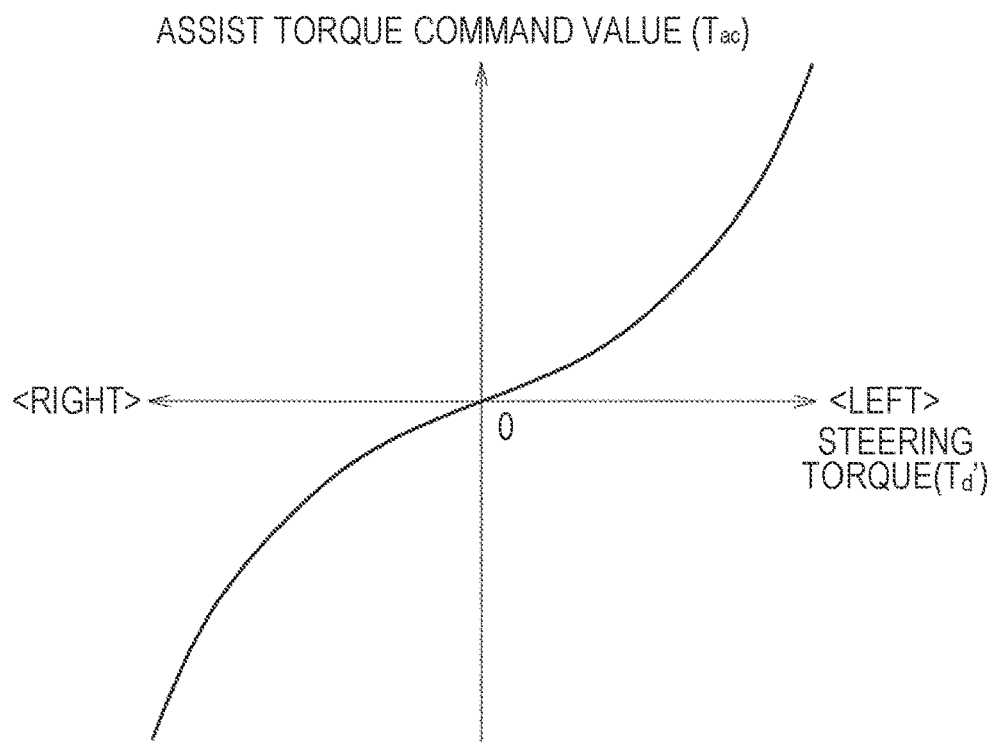
FIG. 4 is a graph illustrating a setting example of an assist torque command value $T_{ac}$ in response to a steering torque $T_d$.

The assist torque command value setting unit 51 sets an assist torque command value $T_{ac}$ which is a target value of an assist torque which is required for a manual operation. The assist torque command value setting unit 51 sets the assist torque command value $T_{ac}$ based on the steering torque $T_d'$ subjected to the first weighting process. A setting example of the assist torque command value $T_{ac}$ in response to the steering torque $T_d'$ is illustrated in FIG. 4. The assist torque command value $T_{ac}$ has a positive value when the steering torque $T_d'$ has a positive value, and has a negative value when the steering torque $T_d'$ has a negative value. The assist torque command value $T_{ac}$ is set such that the absolute value thereof increases as the absolute value of the steering torque $T_d'$ increases.

Figure 5:
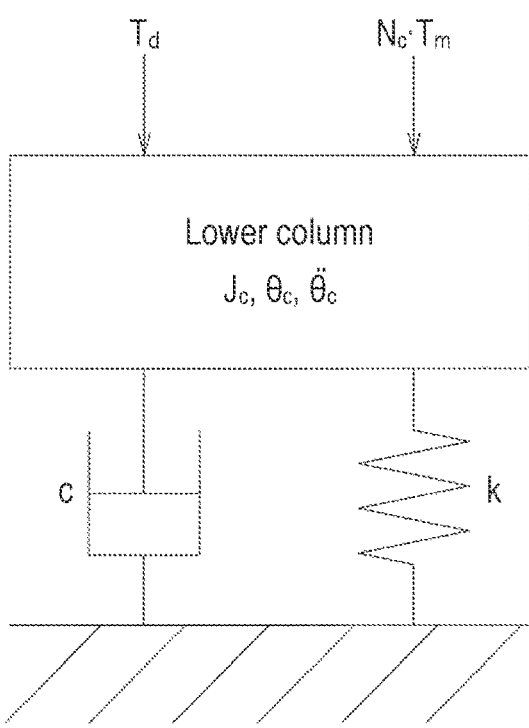
FIG. 5 is a diagram schematically illustrating an example of a reference EPS model which is used in a command value setting unit.

The assist torque command value setting unit 51 may calculate the assist torque command value $T_{ac}$ by multiplying the steering torque $T_d'$ by a preset constant. In this embodiment, the command value setting unit 52 sets the manual steering angle command value $\theta_{mdac}$ using a reference EPS model. FIG. 5 is a diagram schematically illustrating an example of the reference EPS model which is used for the command value setting unit 52.

The reference EPS model is a single inertia model including a lower column. In FIG. 5, $J_c$ is an inertia of the lower column, $\theta_c$ is a rotation angle of the lower column, and $T_d$ is a steering torque. A steering torque $T_d$, a torque $N_c \cdot T_m$ from an electric motor (an assist motor), and a road surface load torque $T_{r1}$ are applied to the lower column. $N_c$ is a reduction ratio of a speed reducer which is provided in a transmission path between the assist motor and the lower column, and $T_m$ is a motor torque which is generated by the assist motor. The road surface load torque $T_{r1}$ is expressed by Expression (1) using a spring constant k and a viscous damping coefficient c.

$$T_{r1} = -k \cdot \theta_c (d\theta_c/dt) \quad (1)$$

In this embodiment, the spring constant k and the viscous damping coefficient c are set to predetermined values which are calculated by experiment, analysis, or the like in advance. A motion equation of the reference EPS model is expressed by Expression (2).

$$J_c \cdot d^2\theta_c/dt^2 = T_d + N_c \cdot T_m - k \cdot \theta_c - c(d\theta_c/dt) \quad (2)$$

Figure 6:
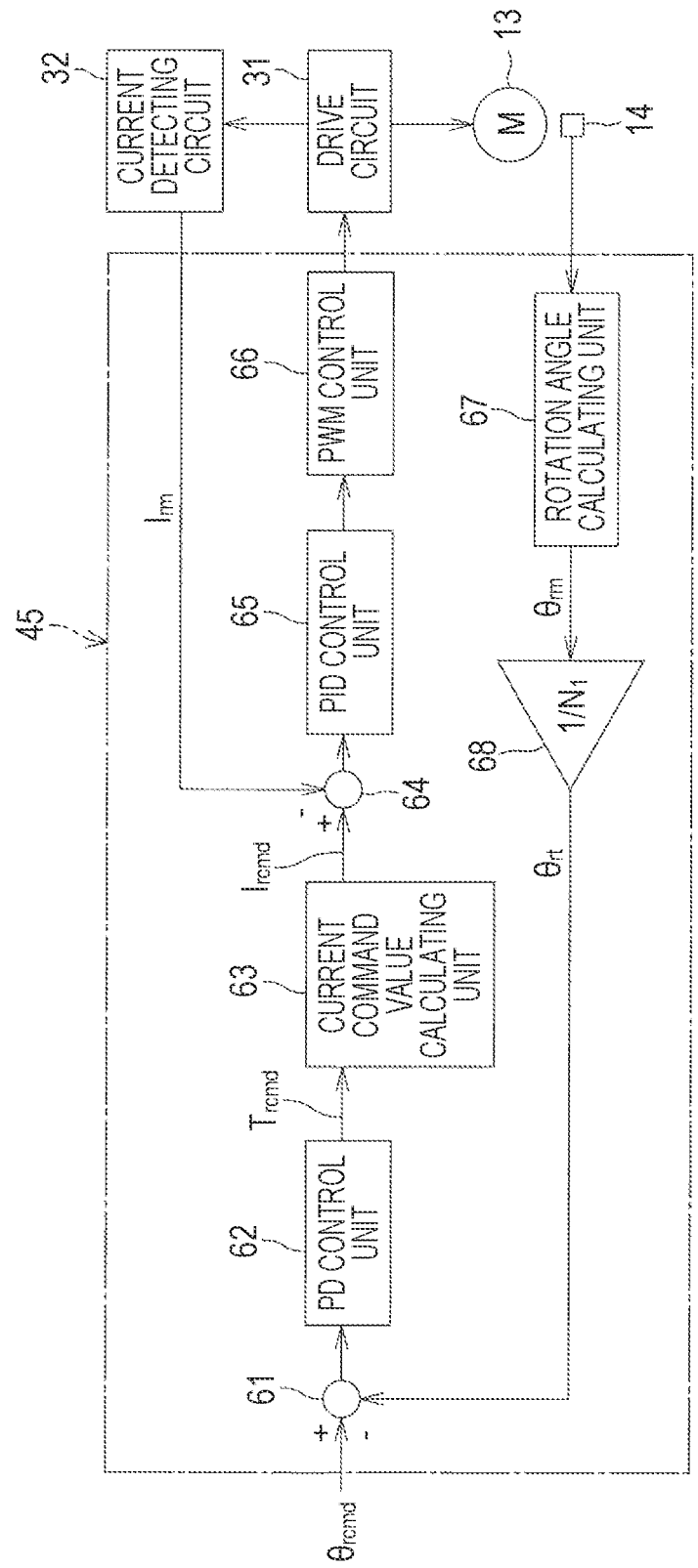
FIG. 6 is a block diagram illustrating a configuration of a reaction angle control unit.

The command value setting unit 52 calculates the rotation angle $\theta_c$ of the lower column by substituting the steering torque $T_d'$ subjected to the first weighting process into $T_d$, substituting the assist torque command value $T_{ac}$ set by the assist torque command value setting unit 51 into $N_c \cdot T_m$, and solving the differential equation of Expression (2). Then, the command value setting unit 52 sets the acquired rotation angle $\theta_c$ of the lower column as the manual steering angle command value $\theta_{mdac}$. The configuration of the reaction angle control unit 45 will be described below. As illustrated in FIG. 6, the reaction angle control unit 45 controls the drive circuit 31 of the reaction motor 13 based on the reaction combined angle command value $\theta_{rcmd}$. The reaction angle control unit 45 includes an angle difference calculating unit 61, a PD control unit 62, a current command value calculating unit 63, a current difference calculating unit 64, a PID control unit 65, a PWM control unit 66, a rotation angle calculating unit 67, and a reduction ratio divider unit 68.

The rotation angle calculating unit 67 calculates a rotor rotation angle $\theta_{rm}$ of the reaction motor 13 based on the output signal of the rotation angle sensor 14. The reduction ratio divider unit 68 converts the rotor rotation angle $\theta_{rm}$ to the rotation angle of the second shaft 9 (an actual steering angle) $\theta_{rt}$ by dividing the rotor rotation angle $\theta_{rm}$ calculated by the rotation angle calculating unit 67 by the reduction ratio $N_1$ of the speed reducer 12. The angle difference calculating unit 61 calculates a difference $\Delta\theta_r$ ($=\theta_{rcmd}-\theta_{rt}$) between the reaction combined angle command value $\theta_{rcmd}$ and the actual steering angle $\theta_{rt}$.

The PD control unit 62 calculates a torque command value $T_{rcmd}$ for the reaction motor 13 by performing a proportional differential operation (a PD operation) on the angle difference $\Delta\theta_r$ calculated by the angle difference calculating unit 61. The current command value calculating unit 63 calculates a current command value $I_{rcmd}$ by dividing the torque command value $T_{rcmd}$ calculated by the PD control unit 62 by a torque constant $K_r$ of the reaction motor 13.

Figure 7:
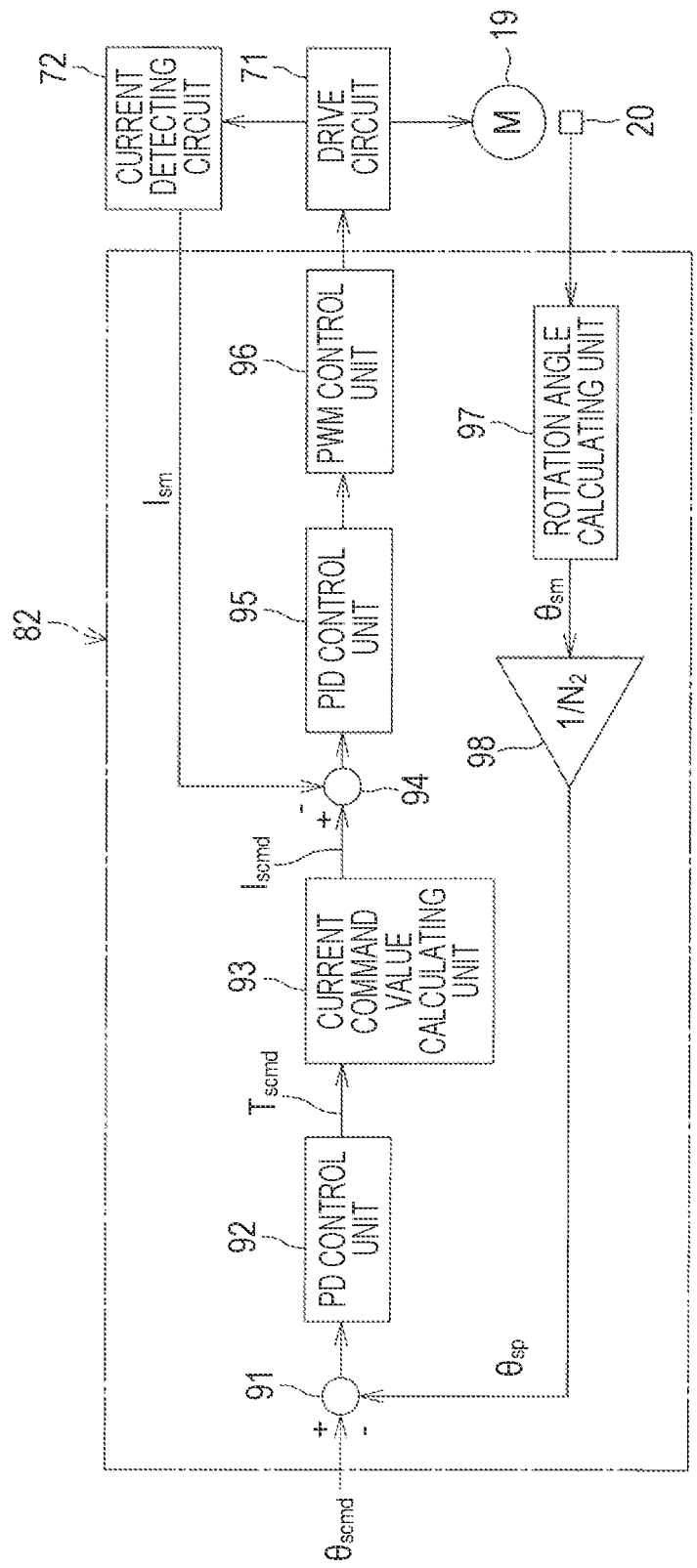
FIG. 7 is a block diagram illustrating a configuration of a turning angle control unit.

The current difference calculating unit 64 calculates a difference $\Delta I_r$ ($=I_{rcmd}-I_{rm}$) between the current command value $I_{rcmd}$ acquired by the current command value calculating unit 63 and the motor current $I_{rm}$ detected by the current detecting circuit 32. The PID control unit 65 generates a drive command value for causing the motor current $I_{rm}$ flowing in the reaction motor 13 to approach the current command value $I_{rcmd}$ by performing a proportional integral-differential operation (a PID operation) on the current difference $\Delta I_r$ calculated by the current difference calculating unit 64. The PWM control unit 66 generates a PWM control signal with a duty ratio (duty cycle) corresponding to the drive command value and supplies the generated PWM control signal to the drive circuit 31. Accordingly, electric power corresponding to the drive command value is supplied to the reaction motor 13. The configuration of the turning angle control unit 82 will be described below. As illustrated in FIG. 7, the turning angle control unit 82 controls the drive circuit 71 of the turning motor 19 based on the turning combined angle command value $\theta_{scmd}$. The turning angle control unit 82 includes an angle difference calculating unit 91, a PD control unit 92, a current command value calculating unit 93, a current difference calculating unit 94, a PID control unit 95, a PWM control unit 96, a rotation angle calculating unit 97, and a reduction ratio divider unit 98.

The rotation angle calculating unit 97 calculates a rotor rotation angle $\theta_{sm}$ of the turning motor 19 based on the output signal of the rotation angle sensor 20. The reduction ratio divider unit 98 converts the rotor rotation angle $\theta_{sm}$ to a rotation angle (an actual turning angle) $\theta_{sp}$ of the pinion shaft 15 by dividing the rotor rotation angle $\theta_{sm}$ calculated by the rotation angle calculating unit 97 by the reduction ratio $N_2$ of the speed reducer 18. The angle difference calculating unit 91 calculates a difference $\Delta\theta_s$ ($=\theta_{scmd}-\theta_{sp}$) between the turning combined angle command value $\theta_{scmd}$ and the actual turning angle $\theta_{sp}$.

The PD control unit 92 calculates a torque command value $T_{scmd}$ for the turning motor 19 by performing a proportional differential operation (a PD operation) on the angle difference $\Delta\theta_s$ calculated by the angle difference calculating unit 91. The current command value calculating unit 93 calculates a current command value $I_{scmd}$ by dividing the torque command value $T_{scmd}$ calculated by the PD control unit 92 by a torque constant $K_s$ of the turning motor 19.

The current difference calculating unit 94 calculates a difference $\Delta I_s$ ($=I_{scmd}-I_{sm}$) between the current command value $I_{scmd}$ acquired by the current command value calculating unit 93 and the motor current $I_{sm}$ detected by the current detecting circuit 72. The PID control unit 95 generates a drive command value for causing the motor current $I_{sm}$ flowing in the turning motor 19 to approach the current command value $I_{scmd}$ by performing a proportional integral-differential operation (a PID operation) on the current difference $\Delta I_s$ calculated by the current difference calculating unit 94. The PWM control unit 96 generates a PWM control signal with a duty ratio (duty cycle) corresponding to the drive command value and supplies the generated PWM control signal to the drive circuit 71. Accordingly, electric power corresponding to the drive command value is supplied to the turning motor 19. Operations will be described below. The automatic steering mode is a steering mode in which the turning motor 19 is controlled based on only an automatic steering angle command value (a turning automatic steering angle command value) $\theta_{adac}$. The manual steering mode is a steering mode in which the turning motor 19 is controlled based on only a manual steering angle command value $\theta_{mdac}$. The cooperative steering mode is a steering mode in which the turning motor 19 is controlled based on a turning combined angle command value $\theta_{scmd}$ calculated in consideration of both the automatic steering angle command value $\theta_{adac}$ and the manual steering angle command value $\theta_{mdac}$. The cooperative steering mode will be described below. Referring to FIG. 2, the first weighting $W_{md}$ and the second weighting $W_{ad}$ are set to 1.0 when the steering mode is set to the cooperative steering mode. Accordingly, the steering torque $T_d'$ subjected to the first weighting process ($=T_d$) becomes equal to the steering torque $T_d$, and the manual steering angle command value $\theta_{mdac}'$ subjected to the second weighting process ($=W_{md}\cdot\theta_{mdac}$) becomes equal to the manual steering angle command value $\theta_{mdac}$ which is calculated based on the steering torque $T_d$. The automatic steering angle command value $\theta_{adac}'$ subjected to the fourth weighting process ($=W_{ad}\cdot\theta_{adac}$) becomes equal to the automatic steering angle command value $\theta_{adac}$ set by the host ECU 201.

When the hands-on/off determination unit 42 determines that the driver grasps the steering wheel 2, the reaction automatic steering angle command value $\theta_{rtac}'$ subjected to the third weighting process ($=W_{ad}\cdot\theta_{rtac}$) becomes equal to the automatic steering angle command value $\theta_{adac}$. Accordingly, in this case, the reaction combined angle command value $\theta_{rcmd}$ is calculated by adding the manual steering angle command value $\theta_{mdac}$ to the automatic steering angle command value $\theta_{adac}$ set by the host ECU 201, and the reaction motor 13 is controlled based on the reaction combined angle command value $\theta_{rcmd}$. The turning combined angle command value $\theta_{scmd}$ is calculated by adding the manual steering angle command value $\theta_{mdac}$ to the automatic steering angle command value $\theta_{adac}$, and the turning motor 19 is controlled based on the turning combined angle command value $\theta_{scmd}$.

Accordingly, even during automatic steering control, since a driver's intention can be immediately reflected in the turning motor 19 and the reaction motor 13, it is possible to realize cooperative control in which manual steering is possible while steering control (turning control and reaction control (steering wheel angle control)) is performed mainly by automatic steering control without switching between manual steering control and automatic steering control. Since switching between the manual steering control and the automatic steering control can be seamlessly performed, a driver does not feel discomfort at the time of the manual operation.

On the other hand, when the hands-on/off determination unit 42 determines that the driver does not grasp the steering wheel 2, zero is supplied as the reaction automatic steering angle command value $\theta_{rtac}'$ to the third weighting unit 48. Accordingly, in this case, the turning motor 19 is controlled based on the turning combined angle command value $\theta_{scmd}$ obtained by adding the manual steering angle command value $\theta_{mdac}$ to the automatic steering angle command value $\theta_{adac}$, and the reaction motor 13 is controlled based on the reaction combined angle command value $\theta_{rcmd}$ including only the manual steering angle command value $\theta_{mdac}$. In this case, since the manual steering angle command value $\theta_{mdac}'$ is almost zero, the steering wheel 2 is fixed to a neutral position during automatic steering. Accordingly, it is possible to avoid a situation in which the steering wheel 2 is rotated by automatic steering and a driver gets caught in the steering wheel 2 in a state in which the driver does not grasp the steering wheel 2. The automatic steering mode will be described below. When the steering mode is set to the automatic steering mode, the first weighting $W_{md}$ is set to zero and the second weighting $W_{ad}$ is set to 1.0. Accordingly, the steering torque $T_d'$ subjected to the first weighting process (=$W_{md} \cdot T_d$) and the manual steering angle command value $\theta_{mdac}'$ subjected to the second weighting process are zero. Accordingly, the turning motor 19 is controlled based on only the automatic steering angle command value $\theta_{adac}$, and the reaction motor 13 is controlled based on the turning automatic steering angle command value $\theta_{rtac}$. The manual steering mode will be described below. When the steering mode is set to the manual steering mode, the first weighting $W_{md}$ is set to 1.0 and the second weighting $W_{ad}$ is set to zero. Accordingly, the reaction automatic steering angle command value $\theta_{rtac}'$ subjected to the third weighting process (=$W_{ad} \cdot \theta_{rtac}$) and the automatic steering angle command value $\theta_{adac}'$ subjected to the fourth weighting process (=$W_{ad} \cdot \theta_{adac}$) are zero. Accordingly, the turning motor 19 is controlled based on only the manual steering angle command value $\theta_{mdac}$ and the reaction motor 13 is controlled based on the manual steering angle command value $\theta_{mdac}$.

Figure 8A:
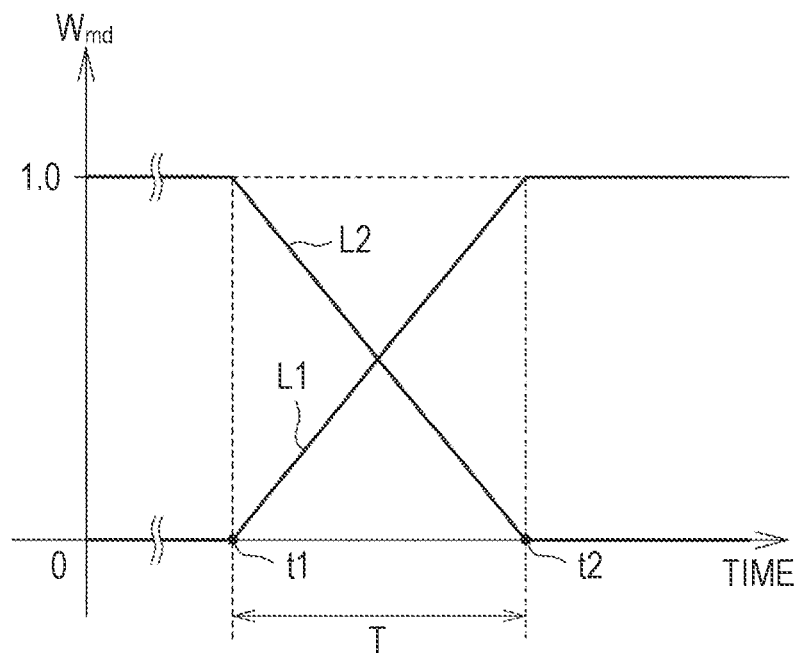
FIG. 8A is a graph illustrating a setting example of a first weighting $W_{md}$ and FIG. 8B is a graph illustrating a setting example of a second weighting $W_{ad}$.
Figure 8B:
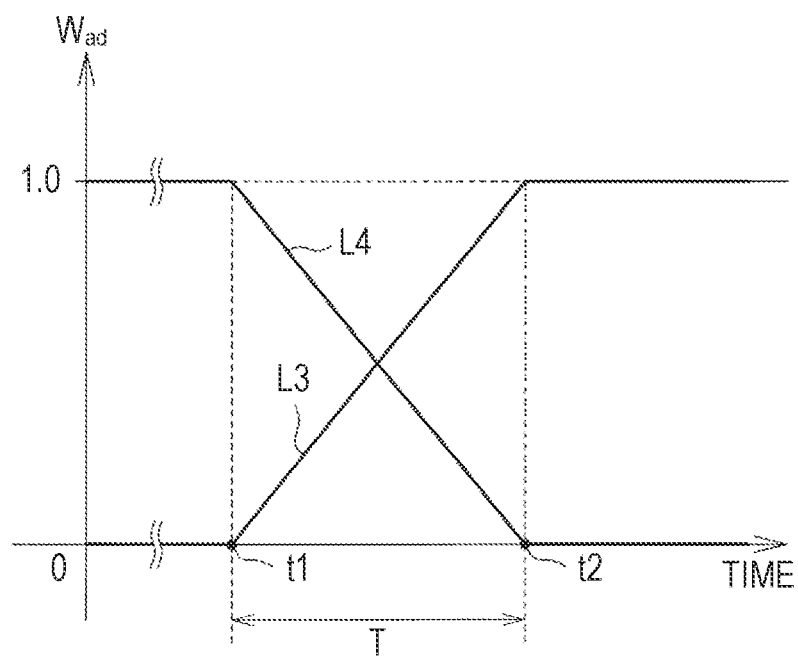

That is, the reaction ECU 202 and the turning ECU 203 can switch the steering mode between the cooperative steering mode, the automatic steering mode, and the manual steering mode by a driver's operation of the mode switches 121, 122, and 123. Setting examples of the weightings $W_{md}$ and $W_{ad}$ will be described below. The setting examples of the first weighting $W_{md}$ and the second weighting $W_{ad}$ with switching of the steering mode are illustrated in FIGS. 8A and 8B. In FIG. 8A, up to a time point t2 at which a predetermined time T has elapsed from the time point at which a mode setting signal $S_1$, $S_2$, or $S_3$ is input (a time point t1), a state in which the first weighting $W_{md}$ increases gradually from zero to 1.0 is indicated by a polygonal line L1 and a state in which the first weighting $W_{md}$ decreases gradually from 1.0 to zero is indicated by a polygonal line L2.

In FIG. 8B, from the time point t1 to the time point t2, a state in which the second weighting $W_{ad}$ increases gradually from zero to 1.0 is indicated by a polygonal line L3 and a state in which the second weighting $W_{ad}$ decreases gradually from 1.0 to zero is indicated by a polygonal line L4. Accordingly, since the absolute values of the steering torque $T_d'$ subjected to the first weighting process (=$W_{md} \cdot T_d$) and the manual steering angle command value $\theta_{mdac}'$ subjected to the second weighting process (=$W_{md} \cdot \theta_{mdac}$) and the absolute values of the reaction automatic steering angle command value $\theta_{rtac}'$ subjected to the third weighting process (=$W_{ad} \cdot \theta_{rtac}$) and the automatic steering angle command value $\theta_{adac}'$ subjected to the fourth weighting process (=$W_{ad} \cdot \theta_{adac}$) increase gradually or decrease gradually, switching between the steering modes is smoothly performed.

The period of time T required to switch the first weighting $W_{md}$ and the second weighting $W_{ad}$ between zero and 1.0 is set to a predetermined value which is calculated by experiment, analysis, or the like in advance. The time T required to switch the first weighting $W_{md}$ between zero and 1.0 may be set to be different from the time T required to switch the second weighting $W_{ad}$ between zero and 1.0. The first weighting $W_{md}$ and the second weighting $W_{ad}$ may be set to increase gradually or decrease gradually nonlinearly instead of linearly.

In the first embodiment, when the mode switch 121, 122, or 123 is operated without changing the steering mode, it is assumed that the operation is invalid. In the first embodiment, when one of the mode switches 121, 122, and 123 is operated in a period until the predetermined period of time T elapses after each mode switch 121, 122, or 123 has been operated, it is assumed that the operation is invalid. Modified examples of the first embodiment will be described below. An automatic steering mode setting signal $S_2$ or a manual steering mode setting signal $S_3$ may be generated depending on whether a driver grasps the steering wheel 2. Specifically, the hands-on/off determination unit 42 outputs the manual steering mode setting signal $S_3$ when a state in which the driver does not grasp the steering wheel 2 (a released state) changes to a state in which the driver grasps the steering wheel 2 (a grasped state). On the other hand, the hands-on/off determination unit 42 outputs the automatic steering mode setting signal $S_2$ when the grasped state changes to the released state.

In this case, regarding switching between the automatic steering mode and the manual steering mode, a driver may switch an operation mode between an operation mode which is performed based on the hands-on/off determination unit 42 and an operation mode which is performed based on the second and third mode switches 122 and 123. In the first embodiment, the first to fourth weighting units 46, 47, 48, and 83 are provided. A first configuration in which the first weighting unit 46, the third weighting unit 48, and the fourth weighting unit 83 are provided and the second weighting unit 47 is omitted may be employed. A second configuration in which the second weighting unit 47, the third weighting unit 48, and the fourth weighting unit 83 are provided and the first weighting unit 46 is omitted may be employed. In the first configuration, the first weighting unit 46 is an example of a "first weighting unit" or a "third weighting unit" in the disclosure. In the second configuration, the second weighting unit 47 is an example of a "first weighting unit" or a "third weighting unit" in the disclosure.

A third configuration in which only the first weighting unit 46 is provided and the second to fourth weighting units 47, 48, and 83 are omitted, a fourth configuration in which only the second weighting unit 47 is provided and the first, third, and fourth weighting units 46, 48, and 83 are omitted, or a fifth configuration in which the first and second weighting units 46 and 47 are provided and the third and fourth weighting units 48 and 83 are omitted may be employed. In this case, when the steering mode is set to the automatic steering mode, the turning motor 19 can be controlled based on only the automatic steering angle command value $\theta_{adac}$ by setting the first weighting $W_{md}$ to zero.

In the third configuration, the first weighting unit 46 is an example of a "first weighting unit" or a "third weighting unit" in the disclosure. In the fourth configuration, the second weighting unit 47 is an example of a "first weighting unit" or a "third weighting unit" in the disclosure. In the fifth configuration, the first weighting unit 46 and the second weighting unit 47 are an example of a "first weighting unit" or a "third weighting unit" in the disclosure.

A sixth configuration in which the third and fourth weighting units 48 and 83 are provided and the first and second weighting units 46 and 47 are omitted may be employed. In this case, when the steering mode is set to the manual steering mode, the turning motor 19 can be controlled based on only the manual steering angle command value $\theta_{mdac}$ by setting the second weighting $W_{ad}$ to zero.

Second Embodiment

Figure 9:
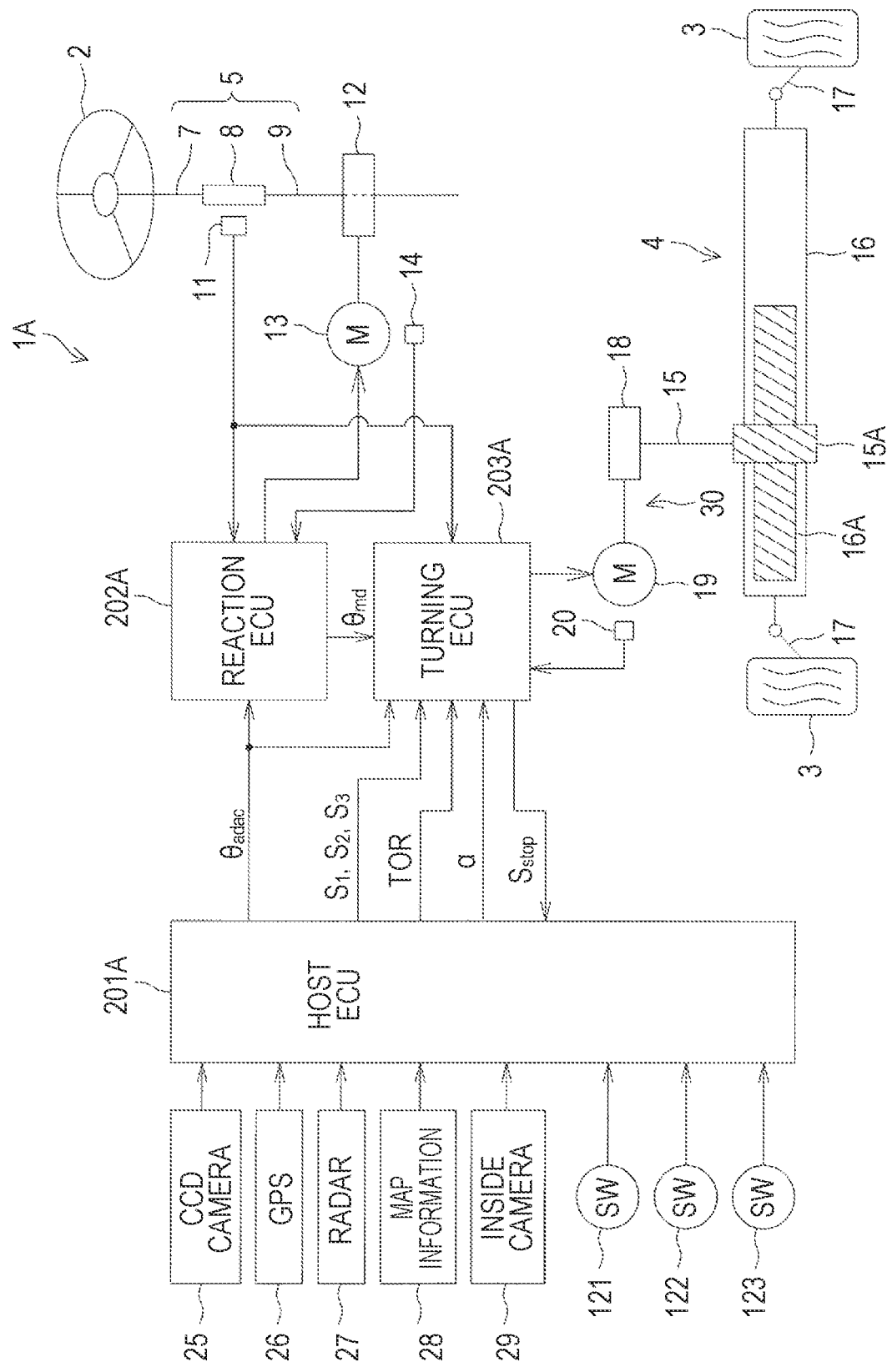
FIG. 9 is a diagram schematically illustrating a configuration of a steering system according to a second embodiment of the disclosure.

A schematic configuration of a steering system 1A according to a second embodiment will be described below. FIG. 9 is a diagram schematically illustrating the configuration of the steering system 1A according to the second embodiment. In FIG. 9, elements corresponding to those described above with reference to FIG. 1 will be referred to by the same reference signs as in FIG. 1.

The steering system 1A according to the second embodiment is different from the steering system 1 according to the first embodiment in the following five points. The first difference is that an inside camera 29 imaging (i.e., captures an image of) a driver is connected to a host ECU 201A. The second difference is that a degree of alertness α and a manual steering request TOR (Take-Over Request) in addition to the automatic steering angle command value $\theta_{adac}$ and the mode setting signals $S_1$, $S_2$, and $S_3$ are supplied from the host ECU 201A to a turning ECU 203A.

The third difference is that the steering torque $T_d$ detected by the torque sensor 11 is supplied to a reaction ECU 202A and the turning ECU 203A. The fourth difference is that the automatic steering angle command value $\theta_{adac}$ is supplied from the host ECU 201A to the reaction ECU 202A but the mode setting signals $S_1$, $S_2$, and $S_3$ are not supplied. The fifth difference is that an automatic stop request $S_{stop}$ is able to be supplied from the turning ECU 203A to the host ECU 201A.

The host ECU 201A determines a degree of alertness α of a driver based on an image of the driver captured by the inside camera 29. In this embodiment, the degree of alertness α has a value equal to or greater than 0 and equal to or less than 1. The degree of alertness α is 0 when the driver sleeps, and the degree of alertness α is 1 when the driver fully opens eyes. The host ECU 201A may determine the degree of alertness α of the driver using another method.

When a situation in which the steering mode is to be switched to the manual steering mode is detected during control in the automatic steering mode, the host ECU 201A generates the manual steering request TOR to the driver by audio, screen display, or the like, at a point a first predetermined time or a first predetermined distance before a point at which the situation is reached. The situation in which the steering mode is to be switched to the manual steering mode during the control in the automatic steering mode is, for example, a situation in which the vehicle moves from an automated driving possible section where automatic driving is possible to an automated driving impossible section where automatic driving is impossible.

Figure 10:
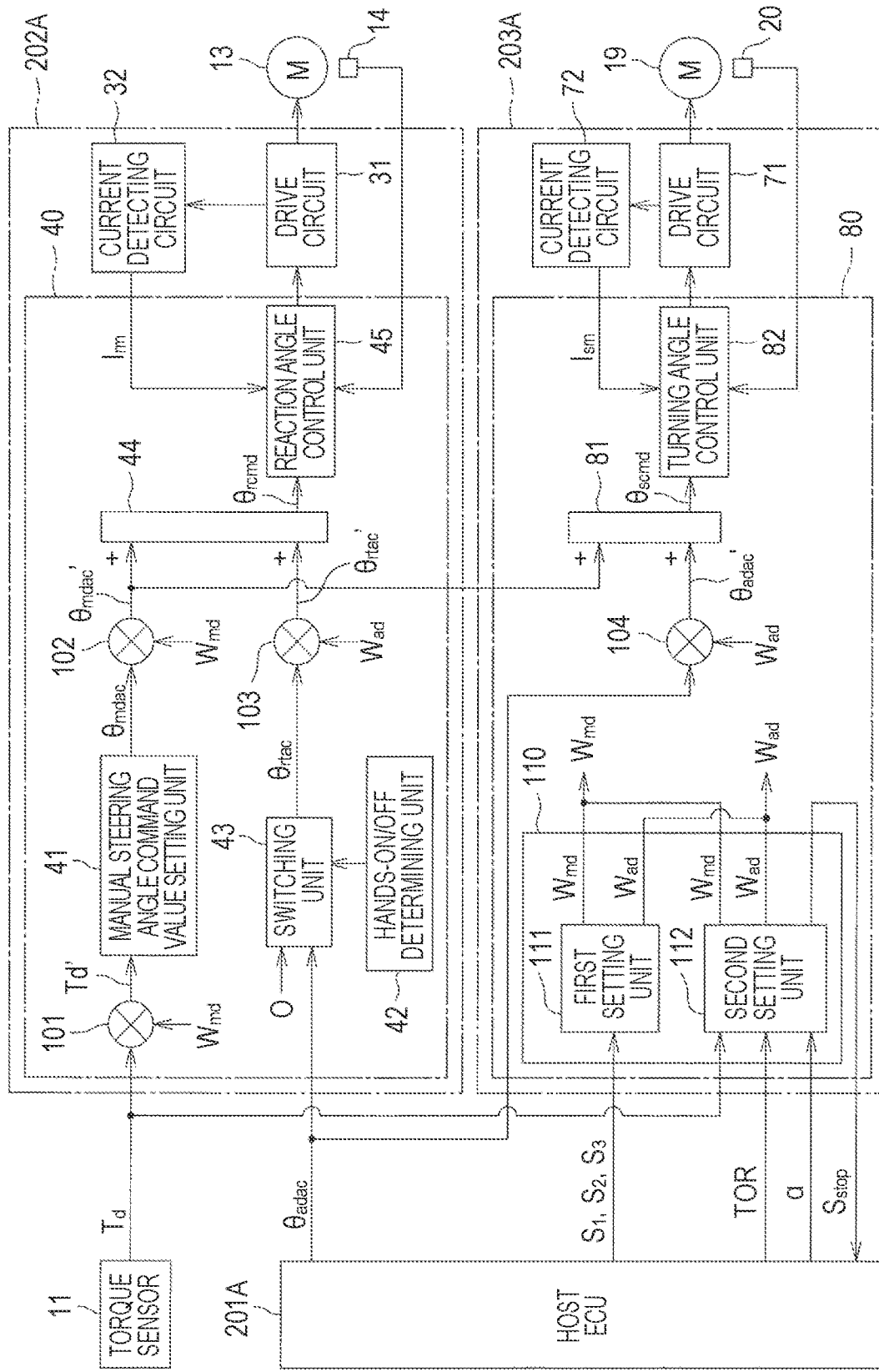
FIG. 10 is a block diagram illustrating an electrical configuration of a reaction ECU and a turning ECU.

As will be described later, the automatic stop request $S_{stop}$ for causing the host ECU 201A to generate an automatic steering angle command value for moving and stopping the vehicle at a predetermined stop position may be supplied from the turning ECU 203A to the host ECU 201A. Electrical configurations of the reaction ECU 202A and the turning ECU 203A will be described below. FIG. 10 is a block diagram illustrating the electrical configurations of the reaction ECU 202A and the turning ECU 203A. In FIG. 10, elements corresponding to those described above with reference to FIG. 2 will be referred to by the same reference signs as in FIG. 2. The reaction ECU 202A will be described below. Referring to FIG. 10, the reaction ECU 202A according to the second embodiment is different from the reaction ECU 202 according to the first embodiment in the configurations of a plurality of functional processing units of a microcomputer 40. The plurality of functional processing units includes a manual steering angle command value setting unit 41, a hands-on/off determination unit 42, a switching unit 43, a reaction combined angle command value calculating unit 44, a reaction angle control unit 45, a first weighting and multiplier unit 101, a second weighting and multiplier unit 102, and a third weighting and multiplier unit 103. The reaction angle control unit 45 is an example of a "reaction force control unit" in the disclosure.

The first weighting and multiplier unit 101 multiplies a steering torque $T_{th}$ detected by the torque sensor 11 by the first weighting $W_{md}$ set by a weighting setting unit 110 which is provided in the turning ECU 203A. Then, the first weighting and multiplier unit 101 supplies the multiplied value $W_{md} \cdot T_d$ as a steering torque $T_d'$ subjected to first weighting and multiplication, to the manual steering angle command value setting unit 41. The first weighting $W_{md}$ has a value equal to or greater than 0 and equal to or less than 1.

The manual steering angle command value setting unit 41 is provided to set a steering angle corresponding to an operation of the steering wheel 2 (more accurately the rotation angle of the second shaft 9) as the manual steering angle command value $\theta_{mdac}$ when a driver operates the steering wheel 2. The manual steering angle command value setting unit 41 sets the manual steering angle command value $\theta_{mdac}$ using a steering torque $T_{th}'$ subjected to first weighting and multiplication. The configuration of the manual steering angle command value setting unit 41 is the same as the configuration of the manual steering angle command value setting unit 41 according to the first embodiment (see FIG. 3) and thus description thereof will be omitted. The manual steering angle command value $\theta_{mdac}$ set by the manual steering angle command value setting unit 41 is supplied to the second weighting and multiplier unit 102.

The second weighting and multiplier unit 102 multiplies the manual steering angle command value $\theta_{mdac}$ by the first weighting $W_{md}$ set by the weighting setting unit 110. Then, the second weighting and multiplier unit 102 supplies the multiplied value $W_{md} \cdot \theta_{mdac}$ as a manual steering angle command value $\theta_{mdac}'$ subjected to first weighting and multiplication, to the reaction combined angle command value calculating unit 44. When the hands-on/off determination unit 42 determines that the driver grasps the steering wheel 2, the switching unit 43 supplies an automatic steering angle command value $\theta_{adac}$ set by the host ECU 201A as a reaction automatic steering angle command value $\theta_{rtac}$, to the third weighting and multiplier unit 103. On the other hand, when the hands-on/off determination unit 42 determines that the driver does not grasp the steering wheel 2, the switching unit 43 supplies zero as the reaction automatic steering angle command value $\theta_{rtac}$, to the third weighting and multiplier unit 103.

The third weighting and multiplier unit 103 multiplies the reaction automatic steering angle command value $\theta_{rtac}$ by the second weighting $W_{ad}$ set by the weighting setting unit 110. Then, the third weighting and multiplier unit 103 supplies the multiplied value $W_{ad} \cdot \theta_{rtac}$ as a reaction automatic steering angle command value $\theta_{rtac}'$ subjected to second weighting and multiplication, to the reaction combined angle command value calculating unit 44. The second weighting $W_{ad}$ has a value equal to or greater than 0 and equal to or less than 1. The reaction combined angle command value calculating unit 44 calculates a reaction combined angle command value $\theta_{rcmd}$ by adding the reaction automatic steering angle command value $\theta_{rtac}'$ subjected to second weighting and multiplication ($=W_{ad} \cdot \theta_{rtac}$) supplied from the third weighting and multiplier unit 103 to the manual steering angle command value $\theta_{mdac}'$ subjected to first weighting and multiplication ($=W_{md} \cdot \theta\theta_{mdac}$) supplied from the second weighting and multiplier unit 102.

The reaction angle control unit 45 controls the angle of the reaction motor 13 based on the reaction combined angle command value $\theta_{rcmd}$. The configuration of the reaction angle control unit 45 is the same as the configuration of the reaction angle control unit 45 according to the first embodiment (see FIG. 6) and thus description thereof will be omitted. The turning ECU 203A will be described below. Referring to FIG. 10, the turning ECU 203A according to the second embodiment is different from the turning ECU 203 according to the first embodiment in the configurations of a plurality of functional processing units of a microcomputer 80. The plurality of functional processing units includes a turning combined angle command value calculating unit 81, a turning angle control unit 82, a fourth weighting and multiplier unit 104, and a weighting setting unit 110. The turning angle control unit 82 is an example of a "turning angle control unit" in the disclosure.

The fourth weighting and multiplier unit 104 multiplies the automatic steering angle command value $\theta_{adac}$ by the second weighting $W_{ad}$ set by the weighting setting unit 110. Then, the fourth weighting and multiplier unit 104 supplies the multiplied value $W_{ad} \cdot \theta_{adac}$ as an automatic steering angle command value $\theta_{adac}'$ subjected to second weighting and multiplication to the turning combined angle command value calculating unit 81. The turning combined angle command value calculating unit 81 calculates a turning combined angle command value $\theta_{scmd}$ by adding the manual steering angle command value $\theta_{mdac}'$ subjected to first weighting and multiplication ($=W_{md} \cdot \theta_{mdac}$) supplied form the second weighting and multiplier unit 102 of the reaction ECU 202 to the automatic steering angle command value $\theta_{adac}'$ subjected to second weighting and multiplication ($=W_{ad} \cdot \theta_{adac}$) supplied from the fourth weighting and multiplier unit 104.

The turning angle control unit 82 controls the angle of the turning motor 19 based on the turning combined angle command value $\theta_{scmd}$. The configuration of the turning angle control unit 82 is the same as the configuration of the turning angle control unit 82 according to the first embodiment (see FIG. 7) and thus description thereof will be omitted. In this embodiment, the first weighting and multiplier unit 101, the second weighting and multiplier unit 102, and the weighting setting unit 110 are an example of a "first weighting unit" or a "third weighting unit" in the disclosure, and the third weighting and multiplier unit 103, the fourth weighting and multiplier unit 104, and the weighting setting unit 110 are an example of a "second weighting unit" or a "fourth weighting unit" in the disclosure. The weighting setting unit 110 will be described below. The weighting setting unit 110 sets the first weighting $W_{md}$ and the second weighting $W_{ad}$ based on the mode setting signals $S_1$, $S_2$, and $S_3$, the manual steering request TOR, the degree of alertness $\alpha$ of a driver supplied from the host ECU 201A and the steering torque $T_d$ detected by the torque sensor 11. In the configuration illustrated in FIG. 10, the mode setting signals $S_1$, $S_2$, and $S_3$, the manual steering request TOR, the degree of alertness $\alpha$ of a driver, and the steering torque $T_d$ are an example of "predetermined first information," "predetermined second information," "predetermined third information," or "predetermined fourth information" in the disclosure.

The automatic steering mode is a steering mode when the first weighting $W_{md}$ is 0 and the second weighting $W_{ad}$ is greater than 0, and is a steering mode in which the turning motor 19 is controlled based on only the automatic steering angle command value $\theta_{adac}$. The manual steering mode is a steering mode when the first weighting $W_{md}$ is greater than 0 and the second weighting $W_{ad}$ is 0, and is a steering mode in which the turning motor 19 is controlled based on only the manual steering angle command value $\theta_{mdac}$. The cooperative steering mode is a steering mode when the first weighting $W_{md}$ is greater than 0 and the second weighting $W_{ad}$ is greater than 0, and is a steering mode in which the turning motor 19 is controlled based on a turning combined angle command value (a cooperative steering command value) $\theta_{scmd}$ calculated in consideration of both the automatic steering angle command value $\theta_{adac}$ and the manual steering angle command value $\theta_{mdac}$.

The weighting setting unit 110 includes a first setting unit 111 and a second setting unit 112. The first setting unit 111 sets the first weighting $W_{md}$ and the second weighting $W_{ad}$ based on the mode setting signals $S_1$, $S_2$, and $S_3$ supplied from the host ECU 201A. The first setting unit 111 is an example of a "switching unit" in the disclosure. The second setting unit 112 sets the first weighting $W_{md}$ and the second weighting $W_{ad}$ based on the manual steering request TOR and the degree of alertness $\alpha$ of a driver supplied from the host ECU 201A and the steering torque $T_d$ detected by the torque sensor 11. The first setting unit 111 will be described below. When the cooperative steering mode setting signal $S_1$ is input, the first setting unit 111 sets the first weighting $W_{md}$ and the second weighting $W_{ad}$ to 1. When the automatic steering mode setting signal $S_2$ is input, the first setting unit 111 sets the first weighting $W_{md}$ to 0 and sets the second weighting $W_{ad}$ to 1. When the manual steering mode setting signal $S_3$ is input, the first setting unit 111 sets the first weighting $W_{md}$ to 1 and sets the second weighting $W_{ad}$ to 0.

The first setting unit 111 may gradually increase the first weighting $W_{md}$ when the first weighting $W_{md}$ changes from 0 to 1, and gradually decrease the first weighting $W_{md}$ when the first weighting $W_{md}$ changes from 1 to 0. Similarly, the first setting unit 111 may gradually increase the second weighting $W_{ad}$ when the second weighting $W_{ad}$ changes from 0 to 1, and gradually decrease the second weighting $W_{ad}$ when the second weighting $W_{ad}$ changes from 1 to 0. The second setting unit 112 will be described below. The outline of the operation of the second setting unit 112 will be described below with reference to FIG. 11. In the following description, the manual steering request TOR is also simply referred to as TOR.

Figure 11:
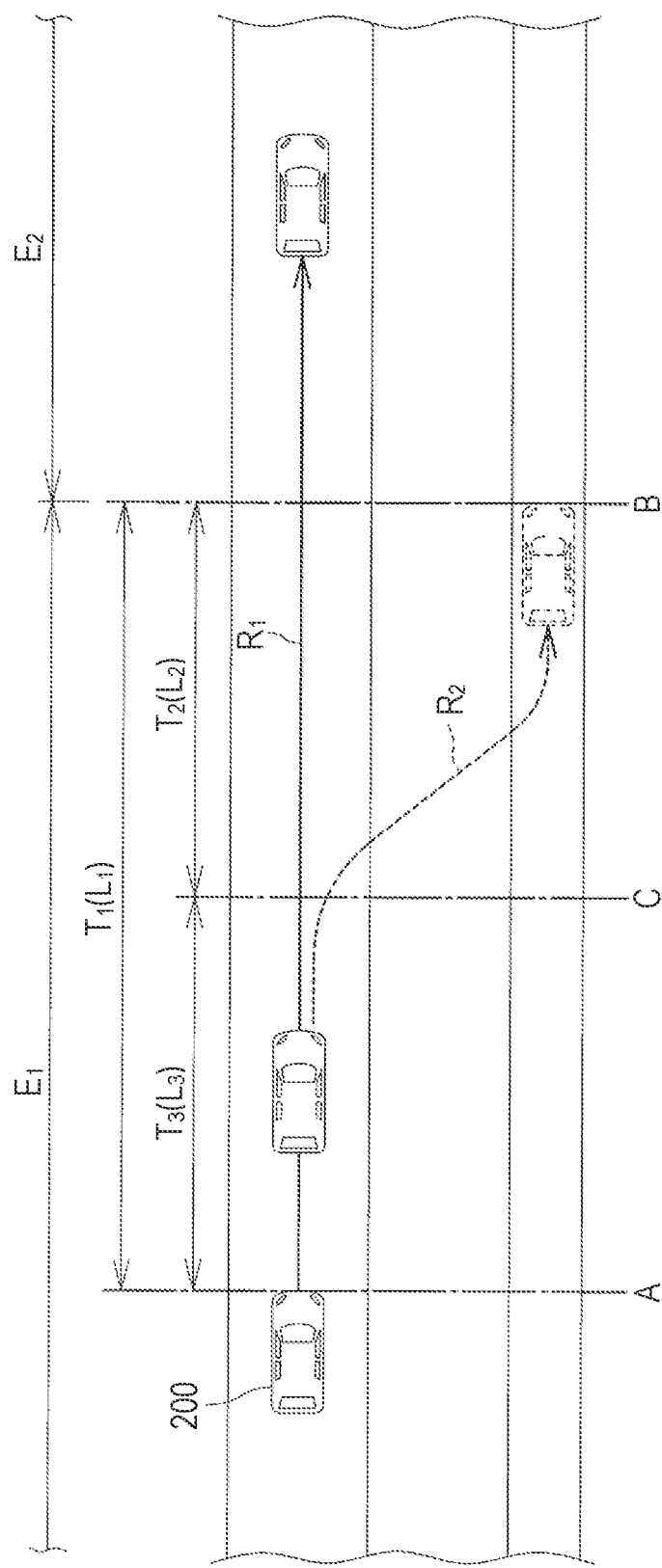
FIG. 11 is a diagram schematically illustrating an operation of a second setting unit.

In FIG. 11, Area $E_1$ represents a part of an automated driving possible area, and Area $E_2$ represents a part of an automated driving impossible area. When a vehicle 200 is traveling toward the right side in FIG. 11 in the automatic steering mode in the automated driving possible area $E_1$, a boundary B between Area $E_1$ and Area $E_2$ is a point at which a "situation in which the steering mode is to be switched to the manual steering mode under control in the automatic steering mode" occurs (hereinafter referred to as a "scheduled manual steering switch point B").

When it is detected that the vehicle 200 approaches the scheduled manual steering switch point B based on information acquired from the CCD camera 25, the GPS 26, and the radar 27 and map information, the host ECU 201A generates a TOR at a point a first predetermined time $T_1$ or a first predetermined distance $L_1$ before a point at which the vehicle 200 reaches the scheduled manual steering switch point B. In this example, when the vehicle 200 reaches Point A in FIG. 11, the host ECU 201A generates the TOR.

When the TOR is received, the second setting unit 112 basically sets the first weighting $W_{md}$ to 1. Accordingly, the steering mode is switched from the automatic steering mode to the cooperative steering mode. When a driver's steering (i.e., steering performed by a driver) is detected at or before a point a second predetermined time $T_2$ or a second predetermined distance $L_2$ before the point at which the vehicle 200 reaches the scheduled manual steering switch point B and then the vehicle 200 reaches the scheduled manual steering switch point B, the second setting unit 112 sets the second weighting $W_{ad}$ to 0. Accordingly, the steering mode is switched from the cooperative steering mode to the manual steering mode. In this case, for example, the vehicle 200 travels along a route indicated by a solid line $R_1$ in FIG. 11.

A point the second predetermined time $T_2$ or the second predetermined distance $L_2$ before the point at which the vehicle reaches the scheduled manual steering switch point B is illustrated as C (Point C) in FIG. 11. In the following description, a period of time required until the vehicle 200 reaches Point C after the vehicle 200 has reached Point A is defined as a third predetermined time $T_3$, and a distance from Point A to Point C is defined as a third predetermined distance $L_3$. On the other hand, when a driver's steering is not detected at or before the point the second predetermined time $T_2$ or the second predetermined distance $L_2$ before the point at which the vehicle 200 reaches the scheduled manual steering switch point B, the second setting unit 112 transmits the automatic stop request $S_{stop}$ to the host ECU 201A. When the automatic stop request $S_{stop}$ is received, the host ECU 201A calculates a route along which the vehicle 200 is moved and stopped at a road shoulder or the like, and generates the automatic steering angle command value $\theta_{adac}$ for automatically steering the vehicle 200 along the route. In this case, the vehicle 200 travels and stops, for example, along the route indicated by a dotted line $R_2$ in FIG. 11.

In this embodiment, when the TOR is received, the second setting unit 112 monitors the degree of alertness α of a driver transmitted from the host ECU 201A and maintains the first weighting $W_{md}$ at 0 until the degree of alertness α of a driver becomes equal to or greater than a predetermined first threshold value $\alpha_{th1}$ after the TOR has been received. When the degree of alertness α of a driver becomes equal to or greater than the first threshold value $\alpha_{th1}$ at or before the point the second predetermined time $T_2$ or the second predetermined distance $L_2$ before the point at which the vehicle 200 reaches the scheduled manual steering switch point B, the second setting unit 112 sets the first weighting $W_{md}$ to 1. Accordingly, the steering mode is switched from the automatic steering mode to the cooperative steering mode.

On the other hand, when the degree of alertness α of a driver does not become equal to or greater than the first threshold value $\alpha_{th1}$ at or before the point the second predetermined time $T_2$ or the second predetermined distance $L_2$ before the point at which the vehicle 200 reaches the scheduled manual steering switch point B, the second setting unit 112 transmits the automatic stop request $S_{stop}$ to the host ECU 201A. In this case, as described above, the vehicle 200 is automatically steered such that the vehicle moves and stops at a road shoulder or the like.

Figure 12:
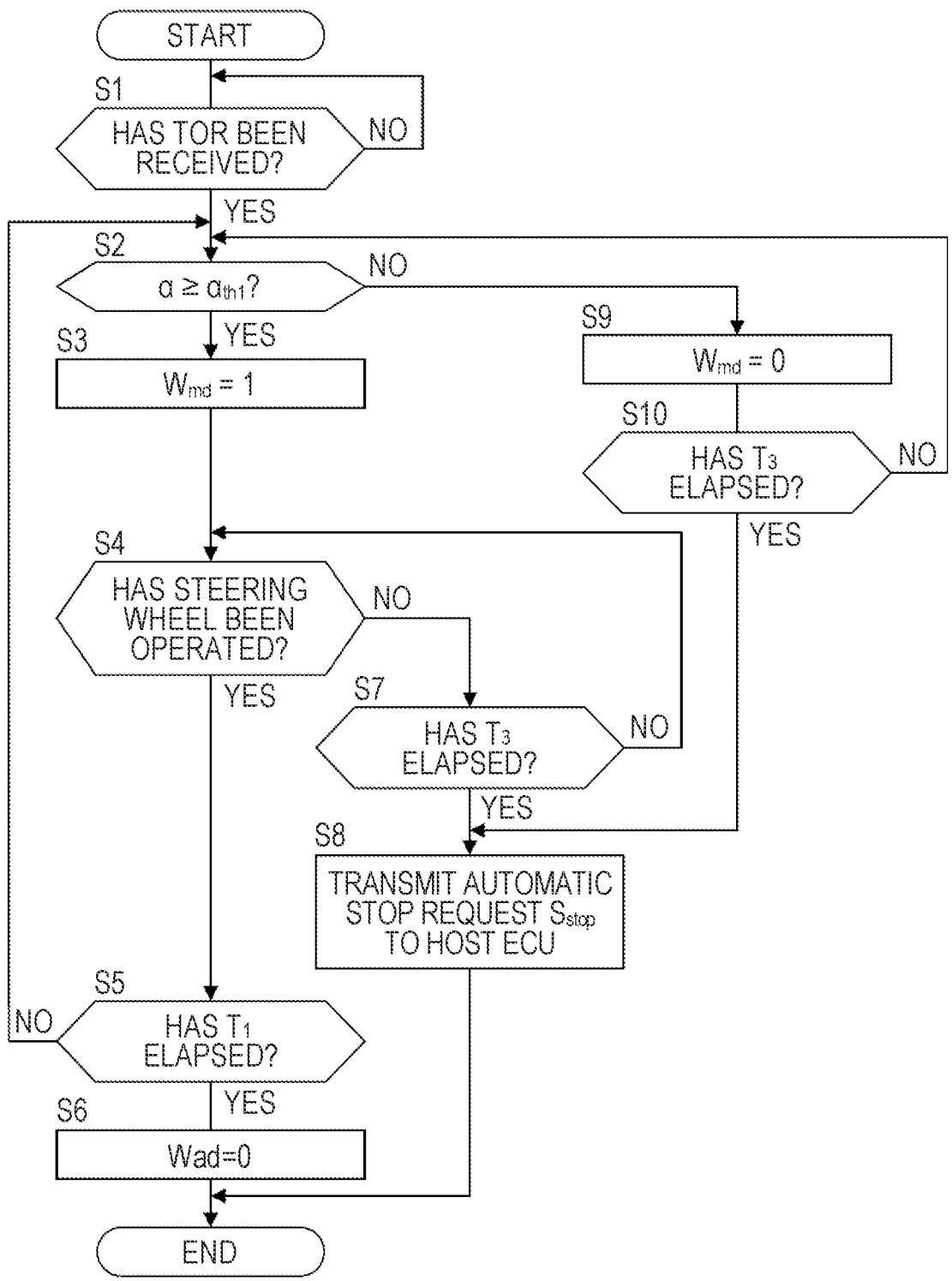
FIG. 12 is a flowchart illustrating an example of a routine of a second setting process which is performed by the second setting unit.

FIG. 12 is a flowchart illustrating an example of a routine of a weighting setting process which is performed by the second setting unit 112. When the TOR is received from the host ECU 201A (Step S1: YES), the second setting unit 112 determines whether the degree of alertness α of a driver transmitted from the host ECU 201A is equal to or greater than a predetermined first threshold value $\alpha_{th1}$ (Step S2).

When the degree of alertness α of a driver is equal to or greater than the first threshold value $\alpha_{th1}$ (Step S2: YES), the second setting unit 112 determines that the driver can drive normally and sets the first weighting $W_{md}$ to 1 (Step S3). Accordingly, the steering mode is switched from the automatic steering mode to the cooperative steering mode. In this embodiment, the first threshold value $\alpha_{th1}$ corresponds to a "predetermined threshold value" in the disclosure.

Then, the second setting unit 112 determines whether the driver has operated the steering wheel (Step S4). In this embodiment, whether the driver has operated the steering wheel is determined, for example, based on a temporal change of the steering torque $T_d$ detected by the torque sensor 11. Whether the driver has operated the steering wheel may be determined using another method. When it is determined that the driver has operated the steering wheel (Step S4: YES), the second setting unit 112 determines whether the first predetermined time $T_1$ has elapsed after the TOR has been received in Step S1 (Step S5).

When the first predetermined time $T_1$ has not elapsed after the TOR has been received (Step S5: NO), the second setting unit 112 returns the routine to Step S2. When it is determined in Step S5 that the first predetermined time $T_1$ has elapsed after the TOR has been received (Step S5: YES), the second setting unit 112 sets the second weighting $W_{ad}$ to zero (Step S6). Then, the second setting unit 112 ends this weighting setting process. Accordingly, the steering mode is switched from the cooperative steering mode to the manual steering mode.

When it is determined in Step S4 that the driver has not operated the steering wheel (Step S4: NO), the second setting unit 112 determines whether a third predetermined time $T_3$ has elapsed after the TOR has been received in Step S1 (Step S7). In other words, the second setting unit 112 determines whether the current time point is the time point the second predetermined time $T_2$ before the time point at which the vehicle reaches the scheduled manual steering switch point B (i.e., whether the time point the second predetermined time $T_2$ before the time point at which the vehicle reaches the scheduled manual steering switch point B has been reached).

When the third predetermined time $T_3$ has not elapsed after the TOR has been received (Step S7: NO), the second setting unit 112 returns the routine to Step S4. When it is determined in Step S7 that the third predetermined time $T_3$ has elapsed after the TOR has been received (Step S7: YES), the second setting unit 112 transmits the automatic stop request $S_{stop}$ to the host ECU 201A (Step S8) and then ends this weighting setting process. In this case, as described above, the vehicle 200 is automatically steered such that it moves and stops at a road shoulder.

When it is determined in Step S2 that the degree of alertness α of a driver is less than the first threshold value $α_{th1}$ (Step S2: NO), the second setting unit 112 determines that the driver cannot drive normally and sets the first weighting $W_{md}$ to zero (Step S9). Then, the second setting unit 112 determines whether the third predetermined time $T_3$ has elapsed after the TOR has been received in Step S1 (Step S10).

When the third predetermined time $T_3$ has not elapsed after the TOR has been received (Step S10: NO), the second setting unit 112 returns the routine to Step S2. When it is determined in Step S10 that the third predetermined time $T_3$ has elapsed after the TOR has been received (Step S10: YES), the second setting unit 112 notifies the automatic stop request $S_{stop}$ to the host ECU 201A (Step S8) and then ends this weighting setting process. Accordingly, as described above, the vehicle is guided and stopped at a road shoulder or the like by automatic steering.

In the weighting setting process illustrated in FIG. 12, when the condition that the degree of alertness α of the driver is equal to or greater than the first threshold value $α_{th1}$ is satisfied at or before the point at which the third predetermined time $T_3$ elapses after the second setting unit 112 has received the TOR, the steering mode is switched from the automatic steering mode to the cooperative steering mode. Accordingly, it is possible to perform manual steering while performing automatic steering. As a result, the driver can prepare for manual driving before the steering mode is switched to the manual steering mode at the scheduled manual steering switch point B.

On the other hand, since only automatic steering is possible until the degree of alertness α of the driver becomes equal to or greater than the first threshold value $α_{th1}$ after the TOR has been received, it is possible to prohibit manual steering from being performed when the driver cannot drive normally. When the third predetermined time $T_3$ has elapsed in a state in which the driver cannot drive normally, the vehicle can be guided and stopped at a safe position by automatic steering.

When the degree of alertness α of the driver becomes equal to or greater than the first threshold value $α_{th1}$ at or before the point at which the third predetermined time $T_3$ elapses after the TOR has been received but the driver's steering is not detected at or before the point at which the third predetermined time $T_3$ elapses after the TOR has been received, the vehicle can be guided and stopped at a safe position by automatic steering. The processes of Step S2, Step S9, and Step S10 in FIG. 12 may be omitted. In this case, when the TOR is received in Step S1 in FIG. 12, the second setting unit 112 causes the routine to proceed to Step S3. In this case, when the TOR is received, the steering mode is unconditionally set to the cooperative steering mode.

Figure 13:
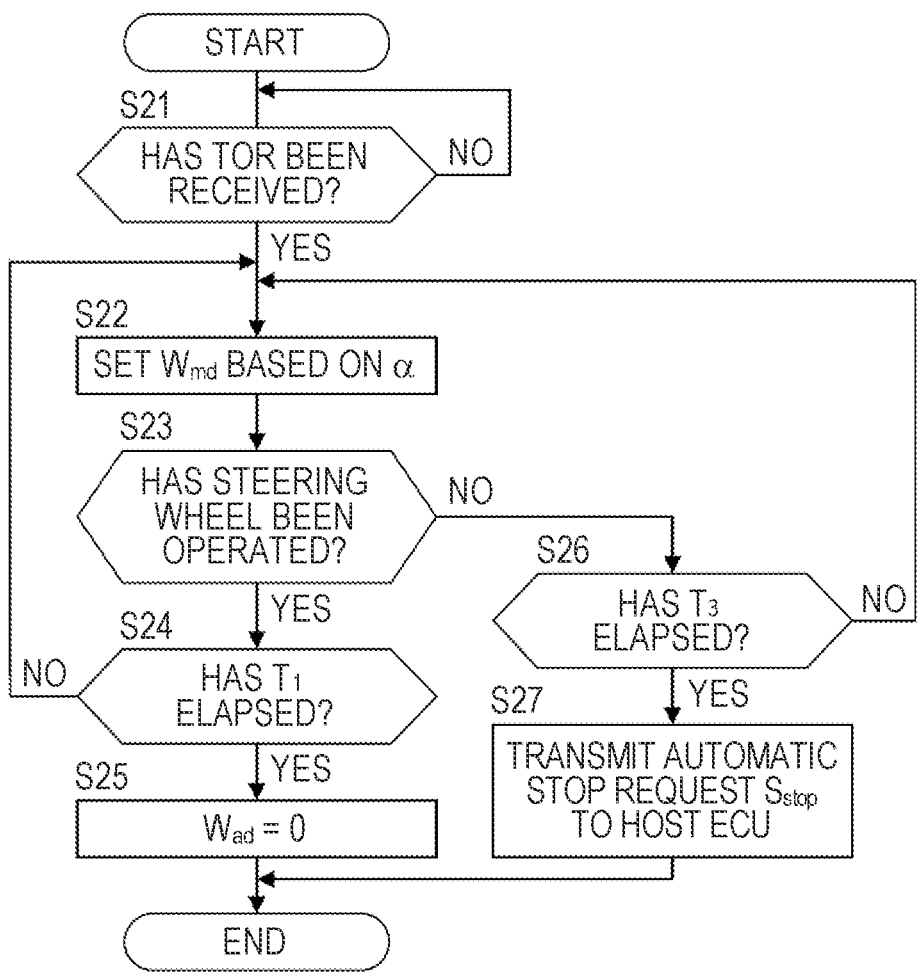
FIG. 13 is a flowchart illustrating a modified example of the routine of the second setting process which is performed by the second setting unit.

FIG. 13 is a flowchart illustrating a modified example of the weighting setting process which is performed by the second setting unit 112. When the TOR is received from the host ECU 201A (Step S21: YES), the second setting unit 112 sets the first weighting $W_{md}$ based on the degree of alertness α of the driver transmitted from the host ECU 201A (Step S22).

The second setting unit 112 sets the first weighting $W_{md}$ such that the first weighting $W_{md}$ increases as the degree of alertness α increases. For example, the second setting unit 112 may set the degree of alertness α as the first weighting $W_{md}$ or may set the first weighting $W_{md}$ based on a predetermined relational expression $W_{md}=F(α)$. When the first weighting $W_{md}$ set in Step S22 is greater than 0, the steering mode is set to the cooperative steering mode. When a minimum value of the degree of alertness α at which the first weighting $W_{md}$ is greater than 0 is defined as a second threshold value $α_{th2}$, the second threshold value $α_{th2}$ in this modified example corresponds to a "predetermined threshold value" in the disclosure.

The minimum value of the first weighting $W_{md}$ set in Step S22 may be set to a predetermined value which is greater than 0 and less than 1. In this case, when the TOR is received, the steering mode is unconditionally set to the cooperative steering mode. Then, the second setting unit 112 determines whether the driver has operated the steering wheel (Step S23). Whether the driver has operated the steering wheel is determined based on a temporal change of the steering torque $T_d$ detected by the torque sensor 11 in this embodiment.

When it is determined that the driver has operated the steering wheel (Step S23: YES), the second setting unit 112 determines whether the first predetermined time $T_1$ has elapsed after the TOR has been received in Step S21 (Step S24). When the first predetermined time $T_1$ has not elapsed after the TOR has been received (Step S24: NO), the second setting unit 112 returns the routine to Step S22. Accordingly, the first weighting $W_{md}$ is reset based on the degree of alertness α of the driver, and then the processes of Step S23 and steps subsequent thereto are performed again.

When it is determined in Step S24 that the first predetermined time $T_1$ has elapsed after the TOR has been received (Step S24: YES), the second setting unit 112 sets the second weighting $W_{ad}$ to zero (Step S25). Then, the second setting unit 112 ends this weighting setting process. Accordingly, the steering mode is switched from the cooperative steering mode to the manual steering mode. When it is determined in Step S23 that the driver has not operated the steering wheel (Step S23: NO), the second setting unit 112 determines whether the third predetermined time $T_3$ has elapsed after the TOR has been received in Step S21 (Step S26). In other words, the second setting unit 112 determines whether the current time point is the time point the second predetermined time $T_2$ before the time point at which the vehicle reaches the scheduled manual steering switch point B (i.e., whether the time point the second predetermined time $T_2$ before the time point at which the vehicle reaches the scheduled manual steering switch point B has been reached).

When the third predetermined time $T_3$ has not elapsed after the TOR has been received (Step S26: NO), the second setting unit 112 returns the routine to Step S22. Accordingly, the first weighting $W_{md}$ is reset based on the degree of alertness α of the driver, and then the processes of Step S23 and steps subsequent thereto are performed again. When it is determined in Step S26 that the third predetermined time $T_3$ has elapsed after the TOR has been received (Step S26: YES), the second setting unit 112 transmits the automatic stop request $S_{stop}$ to the host ECU 201A (Step S27) and then ends this weighting setting process. In this case, as described above, the vehicle 200 is moved and stopped at a road shoulder or the like by automatic steering.

In the weighting setting process illustrated in FIG. 13, when the second setting unit 112 receives the TOR, the first weighting $W_{md}$ is set based on the degree of alertness α of the driver transmitted from the host ECU 201. Then, when the first weighting $W_{md}$ is greater than 0 (when the degree of alertness α is equal to or greater than the second threshold value $α_{th2}$), the steering mode is set to the cooperative steering mode. Accordingly, it is possible to perform manual steering while performing automatic steering. As a result, similarly to the aforementioned embodiment, the driver can prepare for manual driving before the steering mode is switched to the manual steering mode at the scheduled manual steering switch point B.

In this modified example, when the degree of alertness α of the driver is relatively low, the first weighting $W_{md}$ is set to a relatively small value and thus it is possible to decrease an influence of manual steering on the turning combined angle command value (cooperative steering command value) $\theta_{scmd}$. On the other hand, when the degree of alertness α of the driver is relatively high, the first weighting $W_{md}$ is set to a relatively large value and thus it is possible to increase an influence of manual steering on the turning combined angle command value (cooperative steering command value) $\theta_{scmd}$. Accordingly, in this modified example, it is possible to perform cooperative steering suitable for the degree of alertness α a of the driver.

In this modified example, when the driver's steering is not detected at or before the point at which the third predetermined time $T_3$ elapses after the TOR has been received, it is possible to guide and stop the vehicle at a safe position by automatic steering.

Other Modified Examples of Second Embodiment

In Step S5 in FIG. 12 and Step S24 in FIG. 13, the second setting unit 112 determines whether the first predetermined time $T_1$ has elapsed after the TOR has been received, but may determine whether the vehicle has reached the scheduled manual steering switch point B (see FIG. 11).

In Steps S7 and S10 in FIG. 12 and Step S26 in FIG. 13, the second setting unit 112 determines whether the third predetermined time $T_3$ has elapsed after the TOR has been received, that is, whether the current time point is the time point the second predetermined time $T_2$ before the time point at which the vehicle reaches the scheduled manual steering switch point B (i.e., whether the time point the second predetermined time $T_2$ before the time point at which the vehicle reaches the scheduled manual steering switch point B has been reached). However, the second setting unit 112 may determine whether the vehicle has reached Point C the third predetermined distance $L_3$ after the vehicle position A (see FIG. 11) at which the TOR has been received (i.e., whether the vehicle has reached the point the second predetermined distance $L_2$ before the scheduled manual steering switch point B).

In the second embodiment, the first to fourth weighting and multiplier units 101, 102, 103, and 104 are provided. However, a configuration in which the first weighting and multiplier unit 101, the third weighting and multiplier unit 103, and the fourth weighting and multiplier unit 104 are provided and the second weighting and multiplier unit 102 is omitted may be employed. Alternatively, a configuration in which the second weighting and multiplier unit 102, the third weighting and multiplier unit 103, and the fourth weighting and multiplier unit 104 are provided and the first weighting and multiplier unit 101 is omitted may be employed.

In the former configuration, the first weighting and multiplier unit 101 and the weighting setting unit 110 are an example of a "first weighting unit" or a "third weighting unit" in the disclosure. In the latter configuration, the second weighting and multiplier unit 102 and the weighting setting unit 110 are an example of a "first weighting unit" or a "third weighting unit" in the disclosure. In the second embodiment, the weighting setting unit 110 is provided in the turning ECU 203A, but may be provided in the reaction ECU 202A.

While the first and second embodiments of the disclosure have been described above, the disclosure may be embodied in other forms.

In the first and second embodiments, the same automatic steering angle command value $\theta_{adac}$ is supplied to the reaction ECU 202 or 202A and the turning ECU 203 or 203A from the host ECU 201 or 201A. However, the host ECU 201 or 201A may individually set an automatic steering angle command value for the reaction motor 13 and an automatic steering angle command value for the turning motor 19 and supply the set automatic steering angle command values to the corresponding reaction ECU 202 or 202A and the turning ECU 203 or 203A.

The disclosure can also be applied, for example, to a steer-by-wire system in which a four-wheel steering system in which front wheels and rear wheels are independently turned is employed. In this case, two turning ECUs are provided for the front wheels and the rear wheels. The disclosure can also be applied to a steer-by-wire system in which a four-wheel independent steering system in which four wheels are independently turned is employed. In this case, turning ECUs are respectively provided for the wheels.

Various modifications may be made to the above-mentioned embodiments without departing from the scope of the disclosure.

What is claimed is:

1. A steering system comprising:
   a steering member;
   a turning mechanism that is mechanically disconnected from the steering member;
   a reaction motor configured to apply a reaction torque to the steering member;
   a turning motor configured to drive the turning mechanism;
   a steering torque detecting unit configured to detect a steering torque which is applied to the steering member; and
   a control unit configured to control driving of the reaction motor and the turning motor,
   wherein the control unit includes
      a manual steering angle command value setting unit configured to set a manual steering angle command value based on the steering torque,
      a first weighting unit configured to perform a weighting process on the manual steering angle command value in accordance with predetermined first information,
      a reaction combined angle command value calculating unit configured to calculate a reaction combined angle command value based on a reaction automatic steering angle command value and the manual steering angle command value weighted by the first weighting unit,
      a turning combined angle command value calculating unit configured to calculate a turning combined angle command value based on a turning automatic steering angle command value and the manual steering angle command value weighted by the first weighting unit,
      a reaction force control unit configured to cause a rotation angle of the reaction motor to conform to the reaction combined angle command value, and
      a turning angle control unit configured to cause a rotation angle of the turning motor to conform to the turning combined angle command value.

2. The steering system according to claim 1, further comprising a switching unit configured to switch a control mode of the reaction motor and the turning motor to a manual steering mode based on a driver's operation.

3. A steering system comprising:
a steering member;
a turning mechanism that is mechanically disconnected from the steering member;
a reaction motor configured to apply a reaction torque to the steering member;
a turning motor configured to drive the turning mechanism;
a steering torque detecting unit configured to detect a steering torque which is applied to the steering member; and
a control unit configured to control driving of the reaction motor and the turning motor,
wherein the control unit includes
a manual steering angle command value setting unit configured to set a manual steering angle command value based on the steering torque,
a second weighting unit configured to perform a weighting process on a reaction automatic steering angle command value and a turning automatic steering angle command value in accordance with predetermined second information,
a reaction combined angle command value calculating unit configured to calculate a reaction combined angle command value based on the manual steering angle command value and the reaction automatic steering angle command value weighted by the second weighting unit,
a turning combined angle command value calculating unit configured to calculate a turning combined angle command value based on the manual steering angle command value and the turning automatic steering angle command value weighted by the second weighting unit,
a reaction force control unit configured to cause a rotation angle of the reaction motor to conform to the reaction combined angle command value, and
a turning angle control unit configured to cause a rotation angle of the turning motor to conform to the turning combined angle command value.

4. The steering system according to claim 3, further comprising
a switching unit configured to switch a control mode of the reaction motor and the turning motor to a manual steering mode based on a driver's operation.

5. A steering system comprising:
a steering member;
a turning mechanism that is mechanically disconnected from the steering member;
a reaction motor configured to apply a reaction torque to the steering member;
a turning motor configured to drive the turning mechanism;
a steering torque detecting unit configured to detect a steering torque which is applied to the steering member; and
a control unit configured to control driving of the reaction motor and the turning motor,
wherein the control unit includes
a manual steering angle command value setting unit configured to set a manual steering angle command value based on the steering torque,
a third weighting unit configured to perform a weighting process on the manual steering angle command value in accordance with predetermined third information,
a fourth weighting unit configured to perform a weighting process on a reaction automatic steering angle command value and a turning automatic steering angle command value in accordance with predetermined fourth information,
a reaction combined angle command value calculating unit configured to calculate a reaction combined angle command value based on the manual steering angle command value weighted by the third weighting unit and the reaction automatic steering angle command value weighted by the fourth weighting unit,
a turning combined angle command value calculating unit configured to calculate a turning combined angle command value based on the manual steering angle command value weighted by the third weighting unit and the turning automatic steering angle command value weighted by the fourth weighting unit,
a reaction force control unit configured to cause a rotation angle of the reaction motor to conform to the reaction combined angle command value, and
a turning angle control unit configured to cause a rotation angle of the turning motor to conform to the turning combined angle command value.

6. The steering system according to claim 5, wherein:
the control unit includes:
an automatic steering mode in which the reaction motor and the turning motor are controlled based on the reaction automatic steering angle command value and the turning automatic steering angle command value;
a manual steering mode in which the reaction motor and the turning motor are controlled based on the manual steering angle command value; and
a cooperative steering mode in which the reaction motor and the turning motor are controlled based on the reaction automatic steering angle command value and the manual steering angle command value, and a cooperative steering command value which is the turning combined angle command value calculated in consideration of the turning automatic steering angle command value and the manual steering angle command value; and
the control unit is configured to control the reaction motor and the turning motor in the cooperative steering mode unconditionally or when a predetermined condition is satisfied, in a case where a situation in which the automatic steering mode is to be switched to the manual steering mode is detected during control in the automatic steering mode and a manual steering request is output to a driver at a point a first predetermined time or a first predetermined distance before a point at which the situation is reached.

7. The steering system according to claim 6, wherein the control unit is configured to weight the manual steering angle command value based on a degree of alertness of the driver using the third weighting unit and to control the reaction motor and the turning motor in the cooperative steering mode using the weighted manual steering angle command value, when the manual steering request is output to the driver.

8. The steering system according to claim 6, wherein the predetermined condition is a condition that a degree of alertness of the driver is equal to or greater than a predetermined threshold value.

9. The steering system according to claim 6, wherein the control unit is configured to output an automatic stop request for generating the automatic steering angle command value for moving and stopping a vehicle at a predetermined stop position, when steering performed by the driver is not detected at or before a point a second predetermined time or a second predetermined distance before the point at which the situation is reached, after the manual steering request has been output.

10. The steering system according to claim 5, further comprising
a switching unit configured to switch a control mode of the reaction motor and the turning motor to a manual steering mode based on a driver's operation.

* * * * *